US008725555B2

(12) United States Patent
Pieper et al.

(10) Patent No.: US 8,725,555 B2
(45) Date of Patent: May 13, 2014

(54) VENDOR PERFORMANCE MANAGEMENT SYSTEM AND METHOD FOR DETERMINING A VENDOR'S CONTRIBUTION VALUE AND VENDOR SERVICES SCORE

(75) Inventors: Chris M. Pieper, Gig Harbor, WA (US); Lisa C. Gifford, Olympia, WA (US); Darcy E. Fleming, Tacoma, WA (US); Kelly Boston, Olympia, WA (US); Peter Benjamin Bolton Turney, Portland, OR (US); Maitri Ray, Allentown, PA (US)

(73) Assignee: Alliance Enterprises, Inc., Lacey, WA (US)

( * ) Notice: Subject to any disclaimer, the term of this patent is extended or adjusted under 35 U.S.C. 154(b) by 0 days.

(21) Appl. No.: 13/615,234

(22) Filed: Sep. 13, 2012

(65) Prior Publication Data

US 2013/0073345 A1 Mar. 21, 2013

Related U.S. Application Data

(60) Provisional application No. 61/536,413, filed on Sep. 19, 2011.

(51) Int. Cl.
*G06Q 10/00* (2012.01)
(52) U.S. Cl.
USPC .......................... 705/7.38; 705/7.36; 705/7.41
(58) Field of Classification Search
USPC ..................... 705/7.38, 7.36, 7.41
See application file for complete search history.

(56) References Cited

U.S. PATENT DOCUMENTS

| | | | | |
|---|---|---|---|---|
| 5,765,138 A * | 6/1998 | Aycock et al. | ............... | 705/7.23 |
| 6,556,974 B1 * | 4/2003 | D'Alessandro | .............. | 705/7.32 |
| 6,647,374 B2 * | 11/2003 | Kansal | ............................ | 705/37 |
| 7,010,496 B2 * | 3/2006 | Wong | ........................... | 705/7.38 |
| 7,302,405 B2 * | 11/2007 | Hoskin et al. | ............... | 705/7.33 |
| 7,707,055 B2 * | 4/2010 | Behmoiras et al. | .......... | 705/7.38 |
| 7,778,864 B2 * | 8/2010 | Conrad et al. | ............... | 705/7.29 |
| 7,831,463 B2 * | 11/2010 | Nagar | .......................... | 705/7.38 |
| 8,015,057 B1 * | 9/2011 | Pant | ............................ | 705/7.39 |
| 8,069,080 B2 * | 11/2011 | Rastogi | ........................ | 705/7.41 |
| 8,108,428 B1 * | 1/2012 | Wencel et al. | ............... | 707/790 |
| 8,214,251 B2 * | 7/2012 | Handley | ....................... | 705/7.32 |
| 8,311,880 B1 * | 11/2012 | Zabriskie et al. | ............ | 705/7.39 |
| 8,321,263 B2 * | 11/2012 | McCauley | ..................... | 705/7.41 |
| 8,401,928 B2 * | 3/2013 | Herrmann et al. | ......... | 705/26.81 |
| 2002/0072953 A1 * | 6/2002 | Michlowitz et al. | ............ | 705/10 |

(Continued)

OTHER PUBLICATIONS

Vendor Performance Management Technical Assistance Center for Education Program Evaluation Summer, Sep. 22, 2010.*

(Continued)

*Primary Examiner* — Scott L Jarrett
(74) *Attorney, Agent, or Firm* — Seed IP Law Group PLLC

(57) ABSTRACT

The disclosure relates to a computer implemented method and component configured to assess the value of goods and services provided by a vendor to a service agency. An embodiment of the method includes the act of storing, in an electronic database, a total-budget value, an amount-paid value, a case-score value, a total-case-score value, a vendor-service-score value, and a total-vendor-services-score value. The embodiment includes selecting a vendor, forming a vendor-score-contribution value, distributing the case value of one or more service items provided by the vendor, and computing the net contribution of the vendor.

20 Claims, 9 Drawing Sheets

(56) References Cited

U.S. PATENT DOCUMENTS

| | | | |
|---|---|---|---|
| 2002/0133368 A1* | 9/2002 | Strutt et al. | 705/1 |
| 2002/0178049 A1* | 11/2002 | Bye | 705/11 |
| 2003/0095314 A1* | 5/2003 | Shimada et al. | 359/173 |
| 2003/0182413 A1* | 9/2003 | Allen et al. | 709/223 |
| 2004/0068431 A1* | 4/2004 | Smith et al. | 705/10 |
| 2004/0088411 A1* | 5/2004 | Jakubowski et al. | 709/225 |
| 2004/0162763 A1* | 8/2004 | Hoskin et al. | 705/26 |
| 2004/0260602 A1* | 12/2004 | Nakaminami et al. | 705/11 |
| 2005/0216395 A1* | 9/2005 | Behmoiras et al. | 705/38 |
| 2005/0234937 A1* | 10/2005 | Ernest et al. | 707/100 |
| 2006/0053063 A1* | 3/2006 | Nagar | 705/26 |
| 2008/0021930 A1* | 1/2008 | Eisaman et al. | 707/104.1 |
| 2008/0114608 A1* | 5/2008 | Bastien | 705/1 |
| 2008/0300933 A1* | 12/2008 | Britton et al. | 705/7 |
| 2010/0106544 A1* | 4/2010 | Frost et al. | 705/7 |
| 2010/0106617 A1* | 4/2010 | Frost et al. | 705/26 |
| 2010/0145788 A1* | 6/2010 | Kardokas | 705/14.34 |
| 2010/0179845 A1* | 7/2010 | Davidson | 705/7 |
| 2010/0198661 A1* | 8/2010 | McMurray et al. | 705/11 |
| 2010/0268575 A1* | 10/2010 | McCauley | 705/10 |
| 2012/0290364 A1* | 11/2012 | Zeng et al. | 705/7.38 |
| 2012/0303395 A1* | 11/2012 | Saxena et al. | 705/7.11 |
| 2013/0110589 A1* | 5/2013 | McCauley | 705/7.39 |

OTHER PUBLICATIONS

Vendor Performance Management—Vendor Contribution Assessment—Oregon OVRS Pilot Case Study Alliance Enterprise Inc., Nov. 2010.*

Hogan, John E., Expected Relationship Value Industrial Marketing Management, vol. 30, 2001.*

Degraeve, Zeger, A mathematical programming approach for supplier selection using activity based costing Katholieke Universiteit Leuven, Oct. 18, 1996.*

Gunasekaran A., Performance measurement and costing system in new enterprise Technovation, vol. 25, 2005.*

Chen, Chee-Cheng et al., Cost-Effectiveness Based Performance Evaluation for Suppliers and Operations Quality Management Journal, vol. 9, No. 4, 2002.*

Bhutta, Khurrum S. et al., Supplier selection problem: a comparison of total cost of ownershp and analytic hierarchy process approaches, Supply Chain Management, vol. 7, No. 3/4, 2002.*

Horton, Sharon, Creating and Using Supplier Scorecards Contract Management, Sep. 2004.*

Bneson, Gregory E., Supplier Value Index (SVI) Rates MRO Suppliers Institute for Supply Management, 81st Annual International Conference Proceedings, 1996.*

Degraeve, Zeger et al., Effectively Selecting Suppliers Using Total Cost of Ownership Journal of Supply Chain Management, vol. 35, Winter 1999.*

Laseter, Timothy M., Balanced Sourcing Booz, Allen & Hamilton, Inc., 1998.*

Ellram, Lisa M., A structure method for applying purchasing cost managemnet tools International Journal of Purchasing & Materials Management, vol. 32, No. 1, Winter 1996.*

Klotz, Uwe et al., A new Vendor Evaluation Product for SAP R/3 Systems ESIT 2000, Sep. 14-15, 2000.*

MM Vendor Evaluation—Release 4.6C SAP AG, 2000.*

Grimmer, Udo, The Vendor Evaluation Product at DaimlerChrysler ESIT 2000, Sep. 14-15, 2000.*

Thompson, Kenneth H., Vendor Profile Analysis Journal of Purchasing and Materials Management, vol. 26, No. 1, Winter 1990.*

Aware Analytics, "Vendor Performance Management—Vendor Contribution Assessment," Oregon OVRS Pilot Case Study, Alliance Enterprises, Inc., Nov. 2010, 26 pages.

Alliance Enterprises, "Vendor Performance Management," Technical Assistance Center for Education Program Evaluation Summit, Sep. 22, 2010, 40 pages.

Alliance Enterprises, "VCA Installer," Technical Design, 33422, Nov. 5, 2013, 8 pages.

Alliance Enterprises, "VCA Calculation," Technical Design, 32094, Nov. 5, 2013, 14 pages.

Alliance Enterprises, "VCA Calculation," Technical Design, 32095, Nov. 5, 2013, 27 pages.

Alliance Enterprises, "VCA Process Analysis Stage 1: User Interface," Nov. 5, 2013, 9 pages.

Alliance Enterprises, "VCA Process Analysis Stage 2: Case Value Drivers," Nov. 5, 2013, 10 pages.

Alliance Enterprises, "VCA Process Analysis Stage 3: Calculate Vendor Service Score," Nov. 5, 2013, 5 pages.

Alliance Enterprises, "VCA Process Analysis Stage 4: Calculate Vendor Contribution Score," Nov. 5, 2013, 3 pages.

Alliance Enterprises, "VCA Process Analysis Stage 5: Analytics," Nov. 5, 2013, 13 pages.

Alliance Enterprises, "VIP Preview—OVRS Vendor Contribution Assessment," Sep. 20, 2010, 1 page.

Alliance Enterprises, Advisory Committee Letter, dated Dec. 27, 2010, 1 page.

Alliance Enterprises, "Aware Enterprise—Overview," Aware VCA Data Sheet, Feb. 2013, 4 pages.

Alliance Enterprises, "Aware PM—Vendor Value Management," Proposal for Launch Project, Nov. 16, 2009, 10 pages.

* cited by examiner

US 8,725,555 B2

VENDOR PERFORMANCE MANAGEMENT SYSTEM AND METHOD FOR DETERMINING A VENDOR'S CONTRIBUTION VALUE AND VENDOR SERVICES SCORE

CROSS-REFERENCE(S) TO RELATED APPLICATION(S)

This application claims the benefit under 35 U.S.C. §119 (e) of U.S. Provisional Patent Application No. 61/536,413 filed Sep. 19, 2011, where this provisional application is incorporated herein by reference in its entirety.

BACKGROUND

1. Technical Field

The following disclosure relates generally to techniques for providing information related to the assessment of a vendor's contribution to a large service agency and more particularly computing devices and methods to generate such information.

2. Description of the Related Art

Computing devices generate and store information in physical memory. The information is typically stored as a set of digital data files. In a large service agency, such as a public office of motor vehicles or a large home building corporation, computing devices are used to store information data files related to vendors that provide goods and services to the large service agency. The data files may include any type of information related to the vendor. For example, the files may include names, telephone numbers, addresses, types of goods and services provided, prices, subjective notes related to past performance or future expectations, schedules, photographs, sound files, and any other information that a user of the computing device enters or that the computing device generates. In fact, the files stored by a computing device can represent nearly any conceivable type of information related to a vendor.

In some cases, multiple files contain information related to one vendor. For example, one file may have many telephone numbers, including the telephone numbers of a particular vendor. A different file may have many photographs, at least some of which are related to the same particular vendor. Still other files may store accounting information wherein at least some of the file entries of accounting information relate to the particular vendor.

Generally speaking, the volume of information related to a large service agency is stored in many computer files on one or more computing devices. The information may be stored in discrete files or the information may be consolidated in one or more computing databases. One common feature of the files, computing devices, and information discussed herein is that the information is too voluminous to reasonably be generated, maintained, and used without a computing device.

BRIEF SUMMARY

A service agency provides outbound goods, services, or both goods and services to clients (i.e., customers or consumers of the goods or services of the service agency). The service agency may take in money and spend money in order to provide the outbound goods and services. The money that is taken in may be provided by clients, governments, or some other source. The money that is spent may be spent on inbound goods and services provided by vendors. For example, the inbound goods and services that are provided by vendors may include training, employment services, hospitalization and care, rehabilitation, personal care, transition services, personnel, real-estate, utilities, advertising, counseling (e.g., career counseling hours), multimedia, office supplies, food, clothing, medical products (e.g., prosthetic limbs, physical therapy devices, ergonomic devices), and many other things.

The service agency desires to know the quality of its outbound goods and services. The quality of outbound goods and services may include a ratio of money received to money spent, a time duration that a certain client spends using the outbound goods and services, and a measure of satisfaction of clients that have used the outbound goods and services. A determination of quality can be improved if the contribution of individual vendors can be accurately assessed.

The contribution of individual vendors can be assessed by tracking the input and the application of the vendor's goods and services within the service agency. Particular algorithms, as discussed herein, may be used track and quantify the contribution of any particular vendor. An output of the algorithms may be used as one or more measurements that permit comparison of one vendor against another vendor. The output may also be used as a measurement of the efficacy of the service agency as a whole.

A computer-implemented method and component of vendor contribution assessment is taught. The method and component accept input data related to vendors that provide goods and services to a service agency. In various embodiments of the method and component, the impact of the goods and services provided by vendors is tracked, evaluated, and assessed, such that each vendor's contribution to the success or failure of the agency is objectively measured.

In one embodiment, a computer implemented method of assessing vendor performance includes the act of storing a set of data related to a service agency in an electronic database, the set of data having a plurality of at least six datasets. The act of storing in a first one of the datasets a total-budget value, the total-budget value representative of a sum of money the agency has paid for a plurality of service items provided by a plurality of vendors in a plurality of cases wherein each of the plurality of service items is substantially the same type of service item as the other service items and wherein each vendor provides one or more service items in each of one or more cases of the plurality of cases assigned to the vendor is included, and the act of storing, for each case assigned to each vendor, in a second one of the datasets an amount-paid value, the amount-paid value representative of the corresponding payment from the service agency is also included. The embodiments includes storing, for each case assigned to each vendor, in a third one of the datasets a case-score value, a case-score value representing a value of the service items provided by each vendor, storing in a fourth one of the datasets a total-case-score value, the total-case-score value formed by summing the case-score values stored in the third one of the datasets, storing, for each case assigned to each vendor, in a fifth one of the datasets a vendor-service-score value, the vendor-service-score value corresponding to a certain relative value added to the case via the provision of the one or more service items of the plurality of service items provided by each vendor in exchange for a corresponding payment from the service agency, and storing in a sixth one of the datasets a total-vendor-services-score value, the total-vendor-services-score value formed by summing the vendor-services-score values stored in the fifth one of the datasets. The embodiment further includes selecting one vendor of the plurality of vendors; and forming a vendor-score-contribution value, the vendor-score-contribution value formed by distributing the total-budget value to the one or more cases of the plurality of cases assigned to the one vendor to form a case value, distributing the case value to the one or more service items of the plurality of service items provided by the one vendor, and computing the net contribution of the one vendor by mathematically combining the distributed case value from the amount-paid value corresponding to the one vendor.

An aspect of the computer implemented method further includes forming the vendor-score-contribution value by generating a budget-allocation value, the budget-allocation value generated by multiplying the total-budget value by a quotient formed by summing each case-score value related to the one vendor and dividing the sum by the total-case-score value, generating a case-distribution value, the case-distribution value generated by multiplying the budget-allocation value by a quotient formed by summing each vendor-service-score value related to the one vendor and dividing the sum by the total-vendor-services-score value, and generating the vendor-score-contribution value by subtracting the amount-paid value from the case-distribution value.

Another aspect of the computer implemented method further includes selecting a second vendor, forming a second vendor-score-contribution value associated with the second vendor, and comparing the vendor-score-contribution value associated with the one vendor to the vendor-score-contribution value associated with the second vendor.

One more aspect of the computer implemented method includes iteratively selecting a plurality of vendors, forming a vendor-score-contribution value associated with each of the plurality of vendors, sorting the vendors according to the vendor-score-contribution values of each of the plurality of vendors, and outputting a report, the report reflecting the sorted vendors.

Still another aspect of the computer implemented method includes storing the case-score value by performing the acts of selecting one vendor of the plurality of vendors, iteratively selecting a representation of value provided to a client as a result of the one vendor providing a service item to the client, scaling the representation of value to place the representation of value within a certain range, weighting the scaled representation of value by multiplying the scaled representation of value by a weighting factor, summing the weighted and scaled representation of value of each iteration, and storing the summed, weighted, and scaled representations of value in a case-score value memory.

And one more aspect of the computer implemented method includes storing the vendor-service-score value by performing the acts of selecting one vendor of the plurality of vendors, selecting the amount-paid value corresponding to the one vendor, scaling the amount-paid value to place the amount-paid value within a first certain range, weighting the scaled the amount-paid value by multiplying the scaled amount-paid value by a first weighting factor, selecting a representation of value of the service item provided to a client, scaling the representation of value to place the representation of value within a second certain range, weighting the scaled the representation of value by multiplying the scaled the representation of value by a second weighting factor, summing the weighted and scaled amount-paid value with the weighted and scaled representation of value, and storing the sum in a vendor-service-score value memory.

In another embodiment, a computing system includes a central processing unit, a memory, and an input/output port configured in hardware and software as several modules. The modules include a modeling and initialization module configured to store a set of data related to a service agency in an electronic database configured in the memory, the set of data having a plurality of at least six datasets, store in a first dataset a total-budget value, the total-budget value representative of a sum of money the agency has paid for a plurality of service items provided by a plurality of vendors in a plurality of cases wherein each of the plurality of service items is substantially the same type of service item as the other service items and wherein each vendor provides one or more service items in each of one or more cases of the plurality of cases assigned to the vendor, store, for each case assigned to each vendor, in a second one of the datasets an amount-paid value, the amount-paid value representative of the corresponding payment from the service agency, store, for each case assigned to each vendor, in a third one of the datasets a case-score value, a case-score value representing a value of the service items provided by each vendor, and store in a fourth one of the datasets a total-case-score value, the total-case-score value formed by summing the case-score values stored in the third one of the datasets. A vendor value data module is configured to store, for each case assigned to each vendor, in a fifth one of the datasets a vendor-service-score value, the vendor-service-score value corresponding to a certain relative value added to the case via the provision of the one or more service items of the plurality of service items provided by each vendor in exchange for a corresponding payment from the service agency, and store in a sixth one of the datasets a total-vendor-services-score value, the total-vendor-services-score value formed by summing the vendor-services-score values stored in the fifth one of the datasets. A vendor value contribution data module is configured to select one vendor of the plurality of vendors and form a vendor-score-contribution value. The vendor-score-contribution value is formed by distributing the total-budget value to the one or more cases of the plurality of cases assigned to the one vendor to form a case value, distributing the case value to the one or more service items of the plurality of service items provided by the one vendor, and computing the net contribution of the one vendor by mathematically combining the distributed case value from the amount-paid value corresponding to the one vendor.

In still one more embodiment, a non-transitory computer-readable storage medium whose stored contents configure a computing system to perform a method is disclosed. The method includes storing a set of data related to a service agency in an electronic database, the set of data having a plurality of at least six datasets. The method includes the acts of storing in a first one of the datasets a total-budget value, the total-budget value representative of a sum of money the agency has paid for a plurality of service items provided by a plurality of vendors in a plurality of cases wherein each of the plurality of service items is substantially the same type of service item as the other service items and wherein each vendor provides one or more service items in each of one or more cases of the plurality of cases assigned to the vendor, storing, for each case assigned to each vendor, in a second one of the datasets an amount-paid value, the amount-paid value representative of the corresponding payment from the service agency, storing, for each case assigned to each vendor, in a third one of the datasets a case-score value, a case-score value representing a value of the service items provided by each vendor, and storing in a fourth one of the datasets a total-case-score value, the total-case-score value formed by summing the case-score values stored in the third one of the datasets. The method further includes storing, for each case assigned to each vendor, in a fifth one of the datasets a vendor-service-score value, the vendor-service-score value corresponding to a certain relative value added to the case via the provision of the one or more service items of the plurality of service items provided by each vendor in exchange for a corresponding payment from the service agency, storing in a sixth one of the datasets a total-vendor-services-score value, the total-vendor-services-score value formed by summing the vendor-services-score values stored in the fifth one of the datasets, selecting one vendor of the plurality of vendors, and forming a vendor-score-contribution value. The vendor-score-contribution value is formed by distributing the total-budget value to the one or more cases of the plurality of cases assigned to the one vendor to form a case value, distributing the case value to the one or more service items of the plurality of service items provided by the one vendor, and computing the net contribution of the one vendor by mathematically combining the distributed case value from the amount-paid value corresponding to the one vendor.

BRIEF DESCRIPTION OF THE SEVERAL VIEWS OF THE DRAWINGS

Non-limiting and non-exhaustive embodiments are described with reference to the following drawings, wherein like labels and reference numerals designate corresponding parts throughout the several views unless otherwise specified. The sizes and relative positions of elements in the drawings are not necessarily drawn to scale. For example, the shapes of various elements and angles are not drawn to scale, and some of these elements are enlarged and positioned to improve drawing legibility in some cases. One or more embodiments are described hereinafter with reference to the accompanying drawings in which.

DETAILED DESCRIPTION

Figure 1:
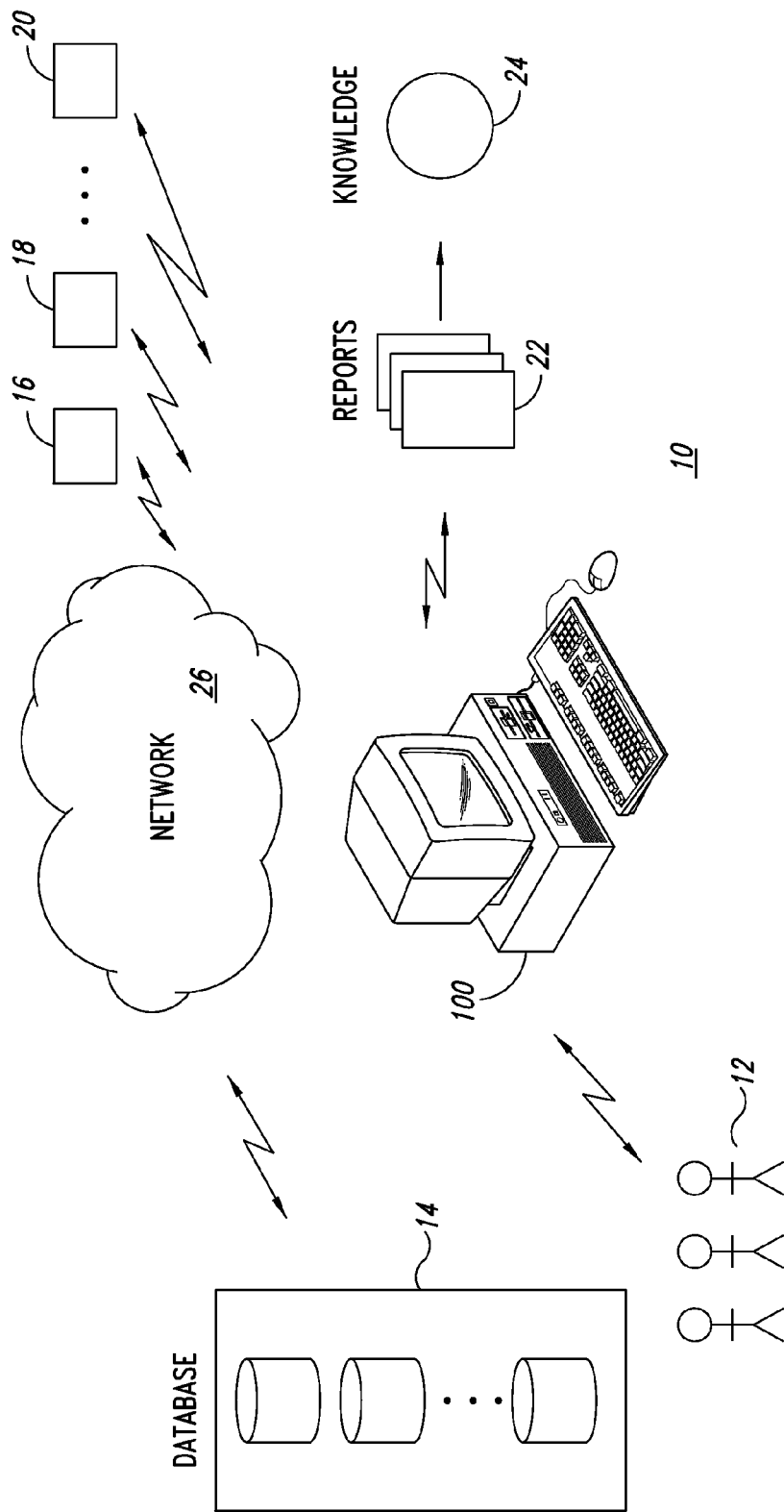
FIG. 1 illustrates an embodiment of a vendor contribution assessment (VCA) system configured in a large vocational rehabilitation service agency.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring descriptions of the embodiments.

A service agency typically fulfills a core function, which may include the provision of certain goods or services to clients. A service agency often has a particular specialty, and the service agency may be the only provider of its goods or services in a known geographic area. The service agency may be structured to earn a profit, or the service agency may be structured as a non-profit organized to provide goods and services to clients at a low cost or no cost to the client. Non-limiting examples of service agencies include the Washington State Department of Vocational Rehabilitation, an aircraft manufacturing company, and a golf course.

A vendor is a seller, trader, salesperson, merchant, supplier, or other entity that promotes or exchanges goods or services for money. A vendor may be a person, a group of people, a business organization, or another type of entity. Non-limiting examples of vendors include producers of job training videos, technical publication writers, caterers, janitors, office supply stores, and the like. Vendors provide to a service agency inbound goods and services, which are generally used by the agency to carry out its core function.

For many reasons, the service agency may desire to know the quality of its outbound the goods and services. For example, if the service agency is a non-profit or government agency, the agency may want to show to taxpayers or donors that the money it receives is being used to effectively and efficiently provide helpful services. If the service agency is a business, the service agency may want to provide detailed information to investors so as to justify the decisions made by the business's leaders. In these or in other cases, the service agency may have a simple desire to improve the quality of goods or services it provides.

One way that a service agency can improve the quality of its outbound goods or services is by using inbound goods and services more effectively and more cost efficiently. Inbound goods and services, which are provided by vendors, can be used more effectively and more cost efficiently if the contribution of individual vendors can be accurately assessed. Stated differently, a service agency can improve its quality if it determines the value contribution of individual vendors that provide goods and services. The value contribution of individual vendors may be derived by comparing the benefit received by a client for goods and services to the cost spent by the agency to deliver the benefit.

Service agencies may use the vendor contribution assessment method and component described herein to assess individual vendors. That is, the VCA system permits a service agency to input data related to individual vendors and generate a "score" for each individual vendor. The generated score for each vendor may be used by the service agency to compare vendors against each other. Thus, the service agency can improve the quality of its outbound goods or services by monitoring the vendor scores and making decisions in light of vendor scores.

As discussed herein, a vocational rehabilitation (VR) service agency implements an exemplary embodiment of a vendor contribution assessment (VCA) system. Nevertheless, one of ordinary skill in the art will recognize that particular details discussed with respect to the VR service agency may also be applied to other service agencies.

A core function of a VR agency is to develop employment opportunities for people with disabilities. Many VR agencies pay millions of dollars annually to a network of vendors to deliver inbound goods and services in support of the agency's core function. Due to complex factors that impact vocational rehabilitation, an objective quantification of vendor performance has heretofore been inconsistent and subjective. As discussed in the exemplary embodiment of a VCA system, however, vendor performance may be quantified, and the transparency of vendor performance can be used to improve overall agency results.

A VCA system embodiment includes a modeling and validation process, which includes certain calculations to determine Vendor Value scores and Vendor Value Contribution scores. The VCA system embodiment includes a multi-dimensional vendor performance database and a computing system. The data storage and calculation provide a system wherein vendor performance can be quantified.

Using the quantified performance data, one or more vendors may be compared to each other. Comparing vendors in the same service category can provide an apples-to-apples comparison of one vendor to another vendor, and in some cases, even comparing vendors in different categories can produce useful information. For example, when underperforming or over-performing vendors are identified, the agency can make corresponding changes. In fact, the agency can use a variety of VCA results to identify focus areas and improve client outcomes. In this way, the VCA may provide transparency and accountability of vendor performance, which the agency can use to improve its overall performance.

FIG. 1 illustrates an embodiment of a vendor contribution assessment (VCA) system 10 configured in a large vocational rehabilitation service agency. At the center of the VCA system 10, a computing device 100 operates. Computing device 100, which optionally includes a keyboard, mouse, electronic display devices, and other input/output devices, may be any type of computing server or other device particularly configured to perform calculations on large volumes of data.

Computing device 100 may receive input data from one or more people 12 including clients, agency employees, or other people. Computing device 100 may further receive input data from a database system 14 (e.g., a SQL database) or any other outside computing resources such as a laptop or other conventional computer 16, a mobile device 18, or some other computing system 20. Computing device 100 operates on the input data to produce vendor contribution assessment data and outputs some or all of the data to the database system 14, other computing resources 16, 18, 20, and people 12. In some cases, the data is presented by way of certain reports 22, which yield information 24 that may be used in pursuit of a core function of the VR service agency.

Although computing device 100 is illustrated as a single device, it is understood that computing device 100 may include a network of cooperating computing devices. In fact, the VCA system 10 may generally operate within a network 26 wherein other computing devices such as database system 14, and other computing resources 16, 18, 20 cooperatively communicate. The devices may communicate with each other and with computing device 100 via any suitable combination of a wide area network (WAN) such as the Internet, a local area network (LAN), a personal area network (PAN), or any other suitable network structure.

Figure 2:
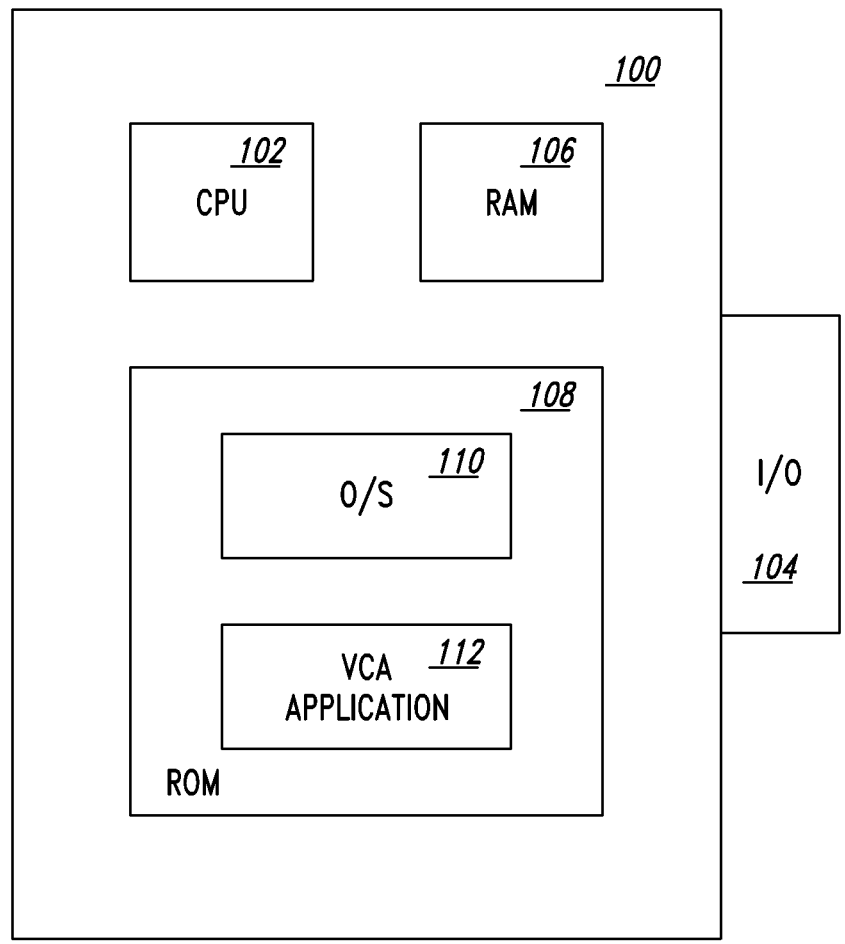
FIG. 2 illustrates in more detail an embodiment of the computing device of the VCA system of FIG. 1.

FIG. 2 illustrates in more detail an embodiment of the computing device 100 of the VCA system 10 of FIG. 1. Computing device 100 has operative electronic circuitry including a central processing unit 102 (CPU), multiple input/output (I/O) ports 104, volatile memory 106 (e.g. RAM), and non-volatile memory 108 (e.g. ROM). Within the ROM 108, several software programs are resident including an operating system 110 and a vendor contribution assessment application 112.

The CPU 108 of the computing device 100 retrieves and executes instructions from ROM 108 and/or RAM 106. The operating system 110 includes application and driver software that permits additional application software and system administrators to control the operation of the computing device 100. For example, particular applications and drivers are used to accept data input and to provide system output through I/O ports 104. That is, keypads, computer mice, memory cards, serial ports, bio-sensor readers, touch screens, network interfaces, and the like are all useful to a programmer, system administrator, or other computing device operator to provide control information into the computing device 100. Displays, printers, memory cards, LED indicators, speakers, network interfaces, and the like are all useful to present output information to the computing device 100 operator.

In addition to application and driver software within the operating system 110, operating system 110 hosts a vendor contribution assessment (VCA) application 112. In one embodiment, the VCA application 112 is capable of processing data and providing information related to the contribution of goods and services of one or more vendors to a core function of a large service agency. The data may be processed and the information rendered for presentation on a local display, on a display coupled through a network (e.g., the Internet), on a mobile device, or on another electronic or non-electronic medium (e.g., printed reports).

The VCA application 112 may be implemented as a collection of one or more software programs capable of communicating with other computing devices. For example, conventional transmission control protocol/Internet protocol (TCP/IP), file transfer protocol (FTP), user datagram protocol (UDP), and the like are useful to permit data such as web pages, database function calls, scripts, and other electronic data to be served to outside computing resources, and further are useful to permit users of the outside computing resources to input data into the computing device 100. That is, the operating system 110 and VCA application 112 may be bi-directionally coupled to outside computing resources 14, 16, 18, 20, via directly connected input devices, local area network (LAN) connections, wide area network (WAN) connections, personal area network connections (PAN), or any other wired or wireless network-capable device connection of network 26.

In some embodiments, the VCA application 112 is stored as one or more files on computer-readable media (CRM). The CRM is non-transitory, and configured to store computing instructions executable by a CPU. Each file may include one or more computer programs or may be part of a larger computer program. Alternatively or in addition, each file may include data or other computational support material for the VCA application 112. The VCA application 112 typically executes a set of instructions stored on computer-readable media.

In other embodiments, the VCA application 112 exists as an entire computing system having a central processing unit 102, memory 106, 108, and an input/output port 104 configured in hardware and software as several modules. The modules of the VCA application 112 embodiment may include hardware (e.g., a CPU, memory, I/O ports, etc.), software, or computing devices having both hardware and software configured to carry out the operations of the module. In some cases, the modules share hardware and software, and in other cases, the modules use dedicated hardware, dedicated software, or some combination.

Figure 3:
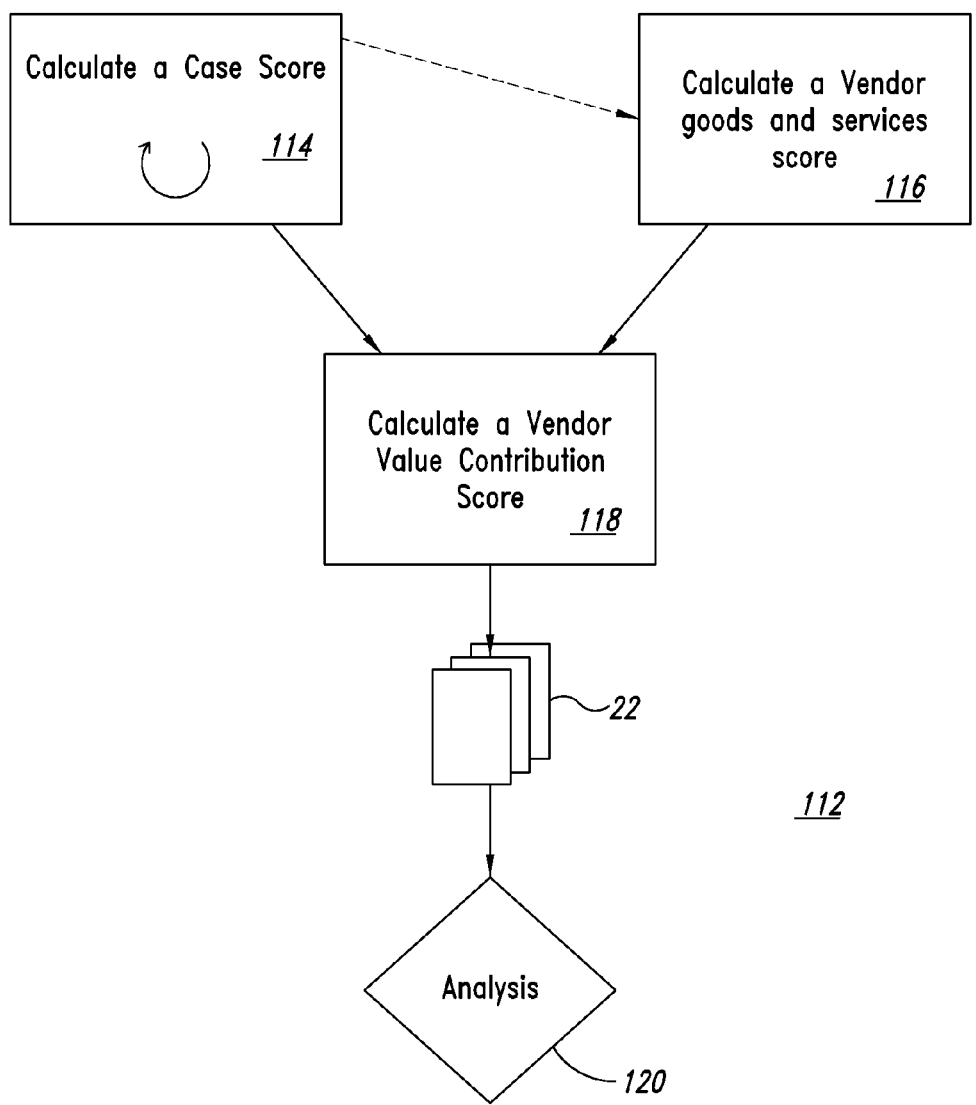
FIG. 3 illustrates a simplified flow diagram of an embodiment of a VCA application.

FIG. 3 illustrates a simplified flow diagram of an embodiment of the VCA application 112. With respect to FIG. 3, certain details of individual modules are described at a high level to illustrate the basic tasks and cooperative relationships of the modules. Subsequent figures and the discussion corresponding to the subsequent figures provide additional detail related to the individual modules of VCA application 112.

As illustrated in FIG. 3, the VCA application 112 implements a quantitative analytical model that calculates a value for each vendor's contribution to an individual client's rehabilitation. In the VCA application 112, a modeling and initialization module 114 creates various data structures and populates the data structures with default data. Initialization processing identifies parameters that are specific to individual client cases and parameters that are generally specific to multiple clients. In the course of performing an assessment of a specific vendor, the VCA application will use the modeling and initialization module 114 to mine a database of the service agency to find cases that meet certain criteria. The criteria may include cases where the specific vendor has provided certain goods or services, cases where other vendors have provided comparable goods or services, cases having a particular duration, and other criteria. Subsequently, a single "case score" is calculated by the modeling and initialization module 114.

In addition to the case score, the modeling and initialization module 114 creates one or more data structures for normalized vendor value data, and one or more data structures for normalized vendor value contribution data. The structures are populated with default data. The vendor value data (VVD) and the vendor value contribution data (VVCD) are used to establish a basis for quantitative comparison between vendors.

Referring to FIG. 3, in a vendor value data (VVD) module 116, a "vendor goods and services score" is calculated. In more detail, vendors provide goods, services, and goods or services to clients. When a vendor supplies goods or when a vendor performs services for a service agency client, the client generally will benefit in some manner from the goods and service provided by the vendor. That is, the vendor has created some form of value for the client. Accordingly, in the VCA application 112 embodiment, in the VVD module 116, a vendor value data (VVD) score represents a benefit that a client of the service agency receives as a result of inbound, vendor-provided goods and services. This VVD score is calculated as described in more detail herein using a particular set of criteria and weighting. For example, in a service agency, VVD criteria may include factors such as a severity of disability, client earnings, and a representation of the complexity of the service that was provided by the vendor. In some cases, information from the modeling and initialization module 114 is also used. By creating such representative values, the VCA application 112 models desirable characteristics of the inbound vendor provided services. Based on the model, the VCA application 112 may then quantify the value created by each vendor that provides goods and services to the service agency clients. In the embodiment, the quantified value produces a vendor value data "score" for a particular good or service, which provides a relative performance metric that can be used to compare one vendor's performance to a determined metric value or to the score(s) of one or more other vendors.

Upon a determination that a vendor has created value for a client by delivering an inbound good or service, a vendor value contribution data (VVCD) module 118 calculates a measurement of the amount of value created. That is, the VVCD module 118 calculates a vendor value contribution score. The VVCD module 118 takes input data from the modeling and initialization module 114 and from the vendor value data module 116. The value created by the vendor for the particular good or service may be compared against the money the service agency paid to the vendor to deliver the good or service.

The difference between the value received by the client as a result of the vendor's inbound good or service and the dollars paid to the vendor by the service agency to deliver the good or service represents vendor value contribution data (VVCD) score. This VVCD "score" can be used to contrast how much value a vendor has created for a client by delivering the good or performing the service versus how much money the service agency paid the vendor to deliver the good or service. This VVCD score can represent one metric used to compare vendors using a common baseline of quantitative data.

Data that is calculated or otherwise generated in the VCA application 112 may be used to optionally generate one or more vendor value data reports 22. The reports 22 may have vendor performance data from one vendor or more. The reports 22 may present data from individual client cases or they may present data from multiple client cases.

At module 120 of FIG. 3, an analysis of data produced by the VCA application 112 may be performed. The analysis may include an in-person review of reports 22, or the analysis may include suggestions generated by the VCA application 112.

Figure 4:
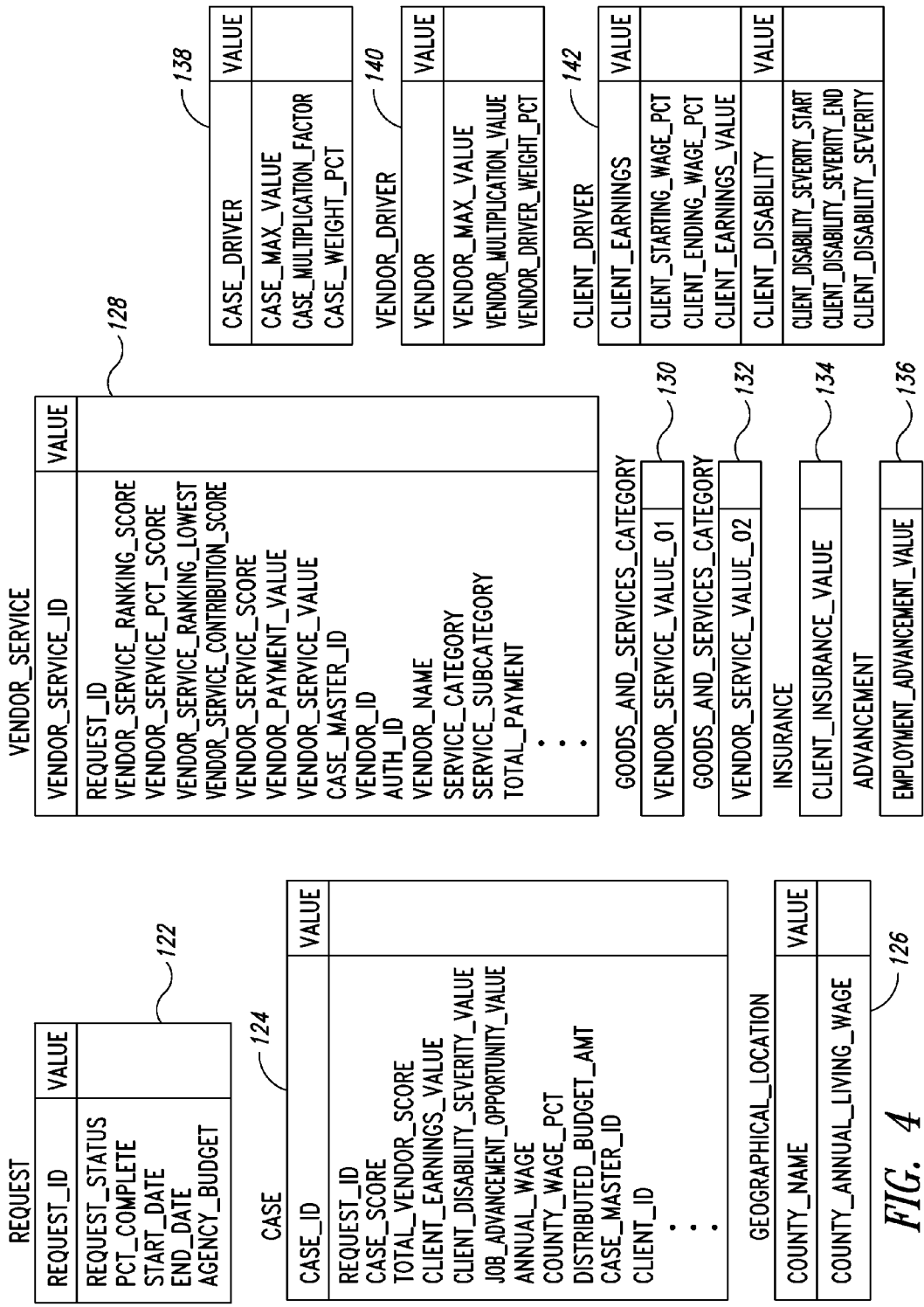
FIG. 4 illustrates a set of data structures that may be used with a VCA application configured in a vocational rehabilitation (VR) service agency environment.

FIG. 4 illustrates a set of data structures that may be used with a VCA application 112 embodiment that is configured in a vocational rehabilitation (VR) service agency environment. The particular data structures of FIG. 4 may be configured in memory of a computing device 100 (FIG. 1), or the data structures may be configured in an external storage repository such as database system 14 (FIG. 1).

Within the non-limiting data structures of FIG. 4, particular areas of storage are configured and initialized for processing by the modeling and initialization module 114 (FIG. 3). A Request Structure 122 is created and populated with a primary Request_ID that can be used to track individual data related to particular clients, cases, vendors, and the like. In the Request Structure 122, particular start and end dates are established, and a budget value is entered. Other data may also be entered. The data may be manually entered by a particular user or programmatically entered using data from another computing system.

Additional structures may also be created by modeling and initialization module 114 (FIG. 3). A Case Structure 124 includes memory space for parameters related to a particular case. A corresponding Case Driver Structure 138 may be used to integrate case data into particular scoring algorithms. A Geographic Location Structure 126 may help localize scoring, cost, wage, or other values in the VCA application 12.

A Vendor Structure 128 includes memory space for parameters related to a particular vendor. A corresponding Vendor Driver Structure 140 may be used to integrate vendor data into particular scoring algorithms. Additionally, a Client Driver Structure 142 may be used to integrate certain client data into particular scoring algorithms. Other data structures, such as a Goods and Services Category Structure 130, a Goods and Services Subcategory Structure 132, an Insurance Structure 134, and an Advancement Structure 136 may also be created.

Figure 5:
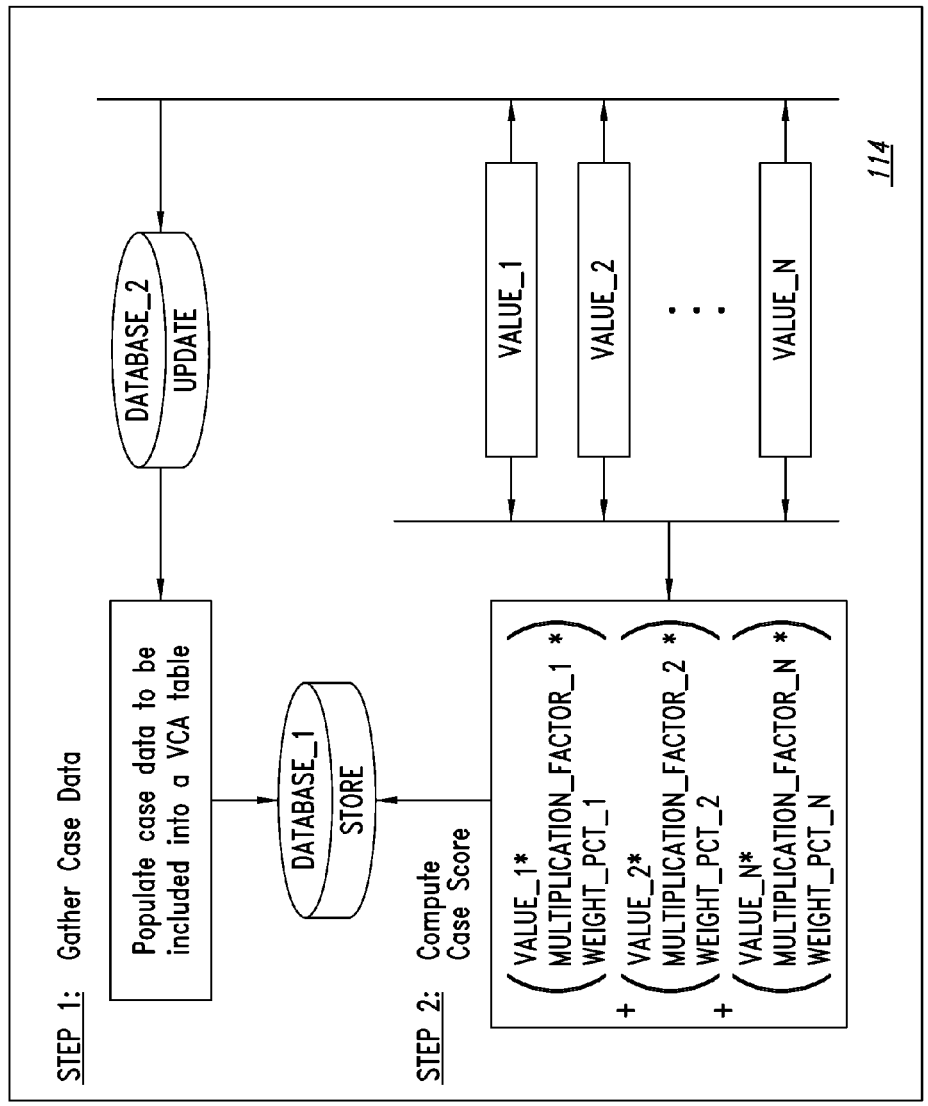
FIG. 5 illustrates a data flow used in a modeling and initialization module embodiment to produce a case score.

FIG. 5 illustrates a data flow used in a modeling and initialization module 114 embodiment to produce a case score. The data flow in FIG. 5 can be used by any service agency. For each client to the service agency, the modeling and initialization module 114 executes the data flow of FIG. 5 to generate a case score. Accordingly, a growing data pool of case scores can be available to the service agency. Since each data score represents a variety of factors related to a certain type of case, and since vendors supply goods and services for each case, particular data related to the performance of each vendor in the certain type of case may be evaluated. In some cases, the case score is generated as services are provided to each client. In other cases, such as when a particular vendor is being assessed, a database will be mined for each of the cases that fit a particular set of criteria, and a corresponding set of case scores will be generated at that time.

At Step 1 in the data flow of FIG. 5, data structures are populated with case data that will be included in a vendor contribution assessment (VCA) table. Data may be drawn from a repository DATABASE_2, which maintains data related to individual case requests. One input to the modeling and initialization module 114 case score calculation data flow of FIG. 5 is a Request_ID that can be used to track additional data and calculations. Other data relevant to the case score may also be requested and loaded into the data structures. Certain data integrity checks may also be conducted.

At Step 2, a case score is calculated. To create the case score, a certain number of values are scaled, multiplied, normalized, and combined. A set of values, (Values 1, 2, ... N) are illustrated in FIG. 5 as inputs to the computation of the case score. Each value is scaled with an associated multiplication factor, and the product is normalized with an associated percentile weighting factor. The computed case score is saved in repository DATABASE_2 during a "STORE" action, and other values are updated in a repository DATABASE_1 in an "UPDATE" action.

In one non-limiting VR service agency embodiment of a modeling and initialization module 114, database values are related to a particular type of job. For example, a plumber is injured, and the plumber may or may not be able to continue working as a plumber. A vocational rehabilitation services agency may take the injured plumber as a client and provide certain services to the injured plumber. For example, the VR services agency may provide for medical help, physical or mental therapy, vocational rehabilitation such as job retraining, skills building, or even career counseling.

At some time, the VR service agency desires to measure the quality of a particular vendor that provides goods or service to benefit an injured plumber. To measure the quality of the vendor, the VR service agency has implemented a VCA application 112 having a modeling and initialization module 114. The modeling and initialization module 114 includes a computation of the relative case score based on data from each client who received vendor services in cases related to an injured worker such as a plumber. The case score computation may be based on wages, severity of client's disability, job benefits, and advancement opportunities. That is, with respect to FIG. 5, VALUE_1 may be related to an injured plumber's wages. VALUE_2 may be related to the severity of injury to a plumber. VALUE_N−1 may be related to employer provided job benefits. And VALUE_N may be related to advancement opportunities available to a plumber.

In the course of providing services to clients over a period of time (e.g., many years), a particular work table may be created for each client that receives goods and services. In this way, a statistically significant database of case score values may be generated. For example, in the present embodiment, the VR service agency may have provided goods and services to many injured plumbers. Accordingly, the VR service agency may be able to build (or may already built) many work tables, each having a case score for a particular injured plumber. Since many vendors will have provided goods and services to the injured plumbers, the VR service agency may use the data to assess the value of the goods and services provided by each individual vendor.

In the embodiment now described with respect to a VR service agency, and with respect to the injured plumber, data structures of the type illustrated in FIG. 4 may be used by the data flow of FIG. 5.

At Step 1 of the data flow of FIG. 5, a Request_ID is generated or otherwise input to the modeling and initialization module 114. The modeling and initialization module 114 identifies particular procedure calls that can be used to generate a case score for a plumber having characteristics related to the injured plumber client.

For example, in the VR service agency embodiment, several procedure calls can be made to produce a case score for the particular injured plumber case. Initial data and interim results may be stored in a particular case work record table configured as a data structure. The procedure calls and work record table data are associated with the Request ID.

A first procedure call may be used to update earnings value for the injured plumber. The procedure may generate or otherwise update data values in the Case Structure 124 memory space and the Case Driver Structure 138 memory space. Data such as annual wages, career starting wages, career ending wages, number hours worked per week, scaling factors for geographic location, and others may be produced and stored. Additionally, a weighting factor may be applied such that the earnings value is representative of some certain percentage (e.g., 33%) of the total case value.

A second procedure call may be used to update a severity value for the disability of the particular injured plumber client. The second procedure may generate or otherwise update data values in the Case Structure 124 memory space and the Case Driver Structure 138 memory space. Data such as a percentage loss of mobility, strength, endurance, and others may be produced and stored. In some cases, certain industry group factors such as factors such as age, weight, gender, and the like may be used to adjust or scale the data. A weighting factor may be applied such that the severity of disability value is representative of some certain percentage (e.g., 33%) of the total case value.

Other procedure calls may also be implemented to generate or otherwise update data values in the Case Structure 124 memory space, Case Driver Structure 138 memory space, Insurance 134 memory space, and Advancement 136 memory space as well as other data structures. For example, data such as whether the client has insurance and the value of the insurance may be generated. Alternatively, or in addition, data related to the advancement opportunities in the subject employment field may be generated. In cases where insurance values and opportunity-for-advancement values are generated, weighting factors may be applied such that the insurance and opportunity-for-advancement values are representative of some certain percentages (e.g., 22% and 11% respectively) of the total case value.

In a non-limiting example, a particular vendor provides goods or services to an injured plumber. The vocational rehabilitation (VR) service agency having the injured plumber as a client sets out to determine the quality of the goods and services provided by the vendor. The VR service agency interrogates its database and finds many cases related to injured workers, such as plumbers. Some cases are those where the vendor has provided a certain good or service, and other cases are those where a different vendor has provided has provided a comparable good or service. The database yields certain values related that can be averaged or otherwise combined.

For example, a first value is representative of earnings of plumbers. Several thousand cases may be examined, and the earnings for a plumber may be in the range of $35,000 to $50,000 annually. The actual earnings value, which may be a composite value derived from the annual earnings for plumbers in the examined cases, may then be normalized with respect to certain factors (e.g., the living wage in the particular geographic area) to take on a value in the range between 1 and 10. In the present example, the first value, which represents earnings, is determined to be 8. A multiplication factor may be used to put the first value into the range having a maximum value of 100. With respect to the case score, the earnings value is assigned a weight of 33 percent. Thus, with respect to FIG. 5, VALUE_1 is 8, MULTIPLICATION_VALUE_1 is 10, and WEIGHT_PCT_1 is 0.33.

In the example, a second value is representative of the severity of injury. The cases in the VR services agency database are examined and ratings of injury-severity are extracted. In the example, a composite injury-severity value from the examined cases is normalized with a multiplication factor into the range having a maximum value of 100. With respect to the case score calculation of FIG. 5, the injury severity value is assigned a weight of 33 percent. Thus, in the example, VALUE_2 is found to be 7, MULTIPLICATION_VALUE_2 is 10, and WEIGHT_PCT_1 is 0.33.

A third value in the example is representative of employer supplied benefits. In the example, benefits are either offered or not offered, so the benefits value is either a zero (0) or a one (1). In order to normalize the benefits value to a number having a maximum value of 100, a scaling factor of 100 is used. With respect to the case score calculation of FIG. 5, the benefit value is assigned a weight of 22 percent. In the example, VALUE_N-1 is found to be 0, MULTIPLICATION_VALUE_N-1 is 100, and WEIGHT_PCT_N-1 is 0.22.

A fourth value in the example is representative of opportunities for advancement in the plumbing field. The value is chosen in a range between 0 and 100, and in this example, the advancement-value is found to be 56. The multiplication factor is 1, and the advancement value is assigned a weight of 11 percent. In the example, VALUE_N is found to be 56, MULTIPLICATION_VALUE_N is 1, and WEIGHT_PCT_N is 0.11.

The case score computation of FIG. 5, can be applied to the example of the vocational rehabilitation (VR) service agency having a vendor that supplies goods and services to an injured plumber. In order to determine the quality of the goods and services provided by the vendor, the VR service agency determines a case score value according to the data flow of FIG. 5. The case score computation in the data flow is illustrated in Equation (1).

$$\sum_{N=1}^{Max} (ValueN * \text{Multiplication\_Factor\_N} * \text{Weight\_PCT\_N}) \quad (1)$$

wherein Max = 4 in one embodiment wherein Max=4 in one embodiment.

The case score computation of FIG. 5 produces a case score, which may be understood as a representation of value from the total value bucket of successfully closed cases mined from the service agency database. One measure of a successful case is that a client is employed for 90 days after receiving service; however, other measures are also possible. Stated differently, the case score is derived from a particular set of criteria (e.g., an injured plumber), and stores an average total representation of the value of goods and services provided by the service agency for each case that meets the criteria.

In addition to determining a case score value, a vendor contribution assessment (VCA) system will also calculate a vendor value data (VVD) score. The VVD score is an objective scoring of the value of goods and services provided by a vendor to a client. Stated differently, the VVD score is an assignment of value from each case to the vendors that provided the goods and services for that particular case. The factors that drive value from a case to a particular vendor are related to the type of goods and services provided and the volume of goods and services provided.

Referring back to FIG. 3, a VVD score is calculated in a vendor value data (VVD) module 116. The vendor value data module 116 is shown with additional detail in FIG. 6.

Figure 6:
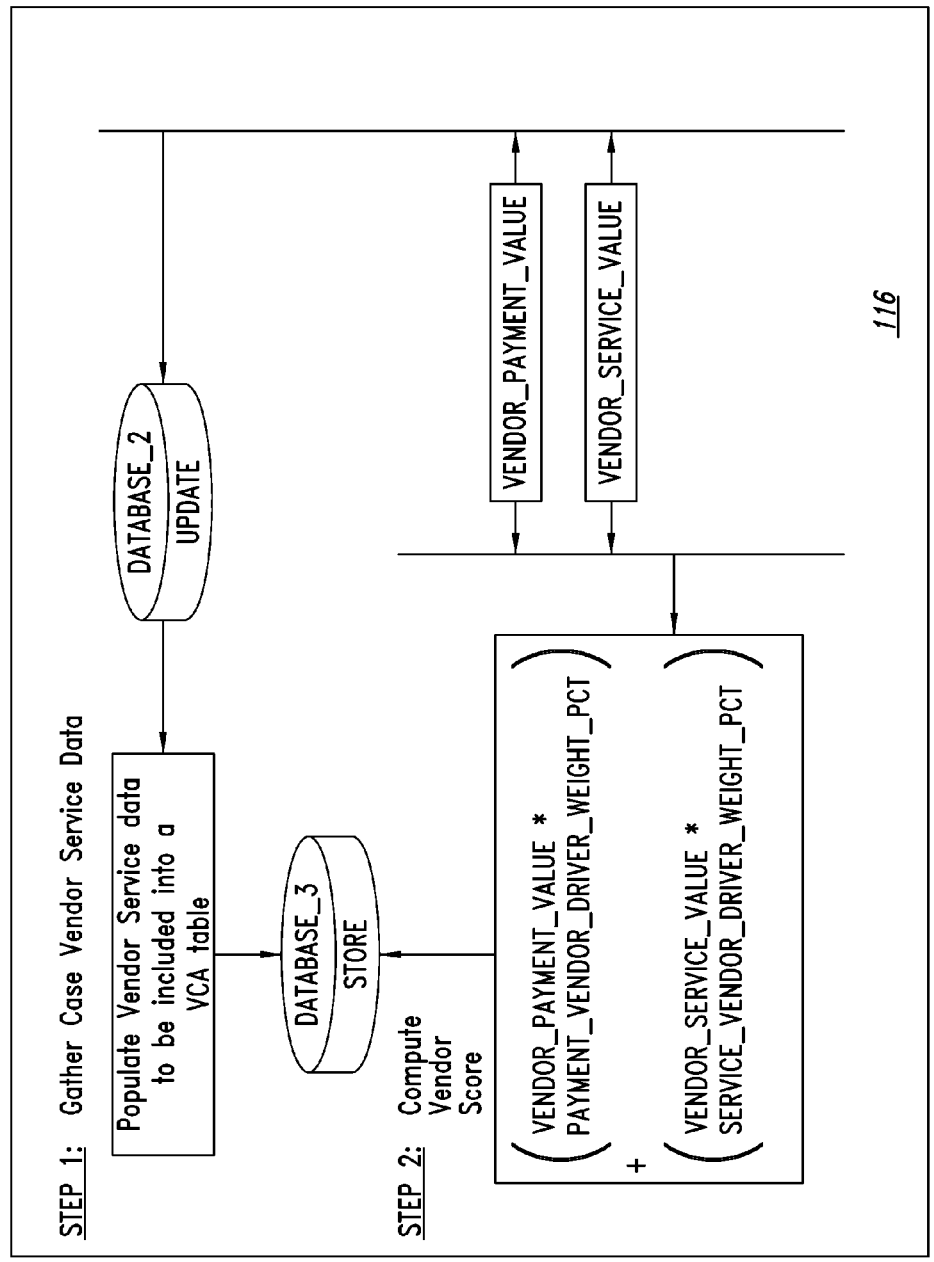
FIG. 6 illustrates a data flow used in a vendor value data module to produce a vendor score.

FIG. 6 illustrates a data flow used in a vendor value data module to produce a vendor score. The data flow in FIG. 6 can be used by any service agency that receives goods or services from vendors. For each good or service provided by a vendor, the vendor value data module 116 executes the data flow of FIG. 6 to generate a vendor value data (VVD) score. In some cases, the VVD score is calculated as goods and services are provided by vendors. In other cases, data is mined from a database when according to certain criteria when a particular vendor is being assessed.

At Step 1 in the data flow of FIG. 6, data structures are populated with case data that will be included in a vendor contribution assessment (VCA) table. Data may be drawn from a repository DATABASE_2, which maintains data related to individual case requests, or data may be drawn from other sources. A Request_ID is input to the VVD module 116. The Request_ID may be input to the modeling and initialization module 114 and passed to the VVD module 116, or the Request_ID may be entered directly into the VVD module 116. The Request_ID can be used to track additional data and calculations. Other data relevant to the case score may also be requested and loaded into the data structures. Certain data integrity checks may also be conducted.

Also at Step 1 of the data flow of FIG. 6, the VVD module 116 identifies particular procedure calls that can be used to generate a vendor value data (VVD) score for an assessment of a particular vendor's performance.

For example, in the VR service agency embodiment, several procedure calls can be made to produce a VVD score for the goods and services provided in the particular injured plumber case. Initial data and interim results may be stored in a particular case work record table configured as a data structure. The procedure calls and work record table data are associated with the Request ID. A first procedure call may be used to calculate a vendor payment value (e.g., VENDOR_SERVICE_VALUE). A second procedure call may be used to calculate a vendor service value (e.g., VENDOR_PAYMENT_VALUE).

At Step 2, a vendor value data (VVD) score is calculated. To create the VVD score, a particular set of inputs are passed to a computation module. The inputs include the vendor payment value and the vendor service value. Each value is normalized with an associated percentile weighting factor. The computed VVD score is saved in a repository DATABASE_3 during a "STORE" action, and other values are updated in a repository DATABASE_2 in an "UPDATE" action.

In a non-limiting VR service agency embodiment of a vendor value data (VVD) module 116, database values may be further illustrated according to the injured plumber example previously introduced. In the injured plumber embodiment now described with respect to a VR service agency, additional data structures of the type illustrated in FIG. 4 may be used by the data flow of FIG. 6.

The first procedure associated with the VVD module 116 calculates the vendor payment value, VENDOR_PAYMENT_VALUE. The vendor payment value defines a relative value of payments made for each good and service provide by a particular vendor. The vendor payment value is generally calculated as a ratio of the sum of all payments made to vendors for all of the goods and services provided by the vendors within a case (e.g., Total Case Service Payments)

and the sum of payments to a particular vendor for a particular good or service in the particular case (e.g., Sum of Case Payments). By this ratio, the payment for a single good or service of one vendor is related to all of the payments made to all of the vendors for all of the goods and services in the case.

The second procedure associated with the VVD module 116 calculates a vendor good and service value, VENDOR_SERVICE_VALUE. In the course of vocational rehabilitation, the VR service agency may contract with vendors for the provision of certain goods and services. Each good and service is classified in terms of the relative value added to the case. In one embodiment, certain data structures of the type illustrated in FIG. 4 (E.g., Goods and Services Category Structure 130 and Goods and Services SubCategory Structure 132) are used to store classifications of services.

In the injured plumber embodiment, values for particular goods and services provided by vendors have been assigned values between 1 and 3, but other value assignments could also be made. For example, with respect to vocational rehabilitation, a non-limiting set of goods and service offerings are illustrated in Table 1.

TABLE 1

Services provided by a VR vendor.

| Service | Value |
| --- | --- |
| Assessment | 3 |
| Group assessment | 3 |
| Group interpreter services | 2 |
| Interpreter services | 2 |
| Job coaching | 1 |
| Job Placement Assistance | 2 |
| Job placement or retention | 2 |
| Job search assistance | 1 |
| Medical/psychological | 1 |
| Rehabilitation/Assistive Technology Devices | 3 |
| Rehabilitation/Assistive Technology Services | 3 |
| Self employment | 2 |
| Basic remedial or literacy | 1 |
| College or university | 2 |
| Disability related skills training | 3 |
| Job club/search | 1 |
| On-the-Job-Training | 3 |
| Personal & vocational adjustment | 1 |
| Vocational or occupational | 3 |

In the embodiment of Table 1, a range of vendor service values are illustrated as having a range between 1 and 3, inclusive. Other values and ranges may be used, and such values and ranges may be determined by the service agency. The values and ranges generally permit different types of goods and services to be placed in a relative hierarchy according to the perceived value of the good or service in a particular type of case.

For example, in Table 1, the "Job placement assistance" service has an assigned vendor service value of 2, while the "Job search assistance" service has an assigned vendor service value of 1. In the example, the "Job placement assistance" service has been determined to provide more value to a case than a "Job search assistance" service. Accordingly, when calculating a vendor value contribution data score, particular vendors that provide "Job placement assistance" services will potentially have a better score that vendors that provide "Job search assistance" service at least because of the higher initial vendor service value.

For each good or service provided by a vendor, the generated vendor service value data and the vendor payment value data may be associated and combined in the computational data flow of FIG. 6 to produce a vendor value data (VVD) score.

For example, a first vendor payment value is representative of money paid by the service agency to a vendor for the provision of a particular good or service. In one VR service agency example, a vendor is paid $500 for providing an assessment of an injured plumber. In the entire case, which may last many months, and in which the injured plumber receives goods and services from the VR service agency, the VR service agency may pay vendors $57,000 for the benefit of the injured plumber. In this example, a vendor payment value may be calculated as a ration between $57,000 and $500, or 114.

Also in the example, a value may be drawn from a particular table (e.g., Table 1) and stored in a vendor service value. In the VR service agency example, an "Assessment" service may be assigned the value of "3."

In the computational data flow of FIG. 6, the vendor payment value and the vendor service value may be normalized and optionally scaled to maintain values between a particular range (e.g., between 1 and 10). Further, the relative importance or weight of each normalized value may also be applied. In the VR service agency example, a vendor payment value is assigned a 25 percent weighting and a vendor service value is assigned a 75 percent weighting. Other weightings may also be applied.

The vendor value data score computation of FIG. 6, can be applied to the example of the vocational rehabilitation (VR) service agency having a vendor that supplies goods and services to an injured plumber. As part of the computations that are performed to assess the quality of the goods and services provided by the vendor, the VR service agency determines a vendor value data score according to the data flow of FIG. 6. The vendor value data score computation in the data flow is illustrated in Equation (2).

$$(\text{Vendor\_Payment\_Value} * \text{Payment\_Vendor\_Driver\_Weight\_Pct}) + \text{Vendor\_Service\_Value} * \text{Service\_Vendor\_Driver\_Weight\_Pct}) \quad (2)$$

The vendor value data (VVD) score computation of FIG. 6 produces a VVD score, which may be understood as a representation of value from each case to the vendors that provided services for that particular case.

Referring again to FIG. 3, a modeling and initialization module 114 has determined a particular set of case values for each case. The case values represent a model of the value of a particular set of goods and services provided to a client by a service agency. Also in FIG. 3, a vendor value data module 116 has determined a particular representation of value paid to a vendor for individual goods and services in cases according to certain criteria. Data values from the modeling and initialization module 114 and vendor value data module 116 are provided to a vendor value contribution data (VVCD) module 118, which calculates a representation of the amount of value created. That is, the VVCD module 118 calculates a vendor value contribution score. The VVCD module 118 takes input data from the modeling and initialization module 114 and from the vendor value data module 116. The value created by the vendor for the particular good or service may be compared against the money the service agency paid to the vendor to deliver the good or service.

The difference between the value received by the client as a result of the vendor's inbound good or service and the dollars paid to the vendor by the service agency to deliver the good or service is represented by the vendor value contribution data (VVCD) score. This VVCD "score" can be used to contrast how much value a vendor has created for a client by delivering the good or performing the service versus how much money the service agency paid the vendor to deliver the good or service. This VVCD score can represent one metric used to compare vendors using a common baseline of quantitative data.

Figure 7:
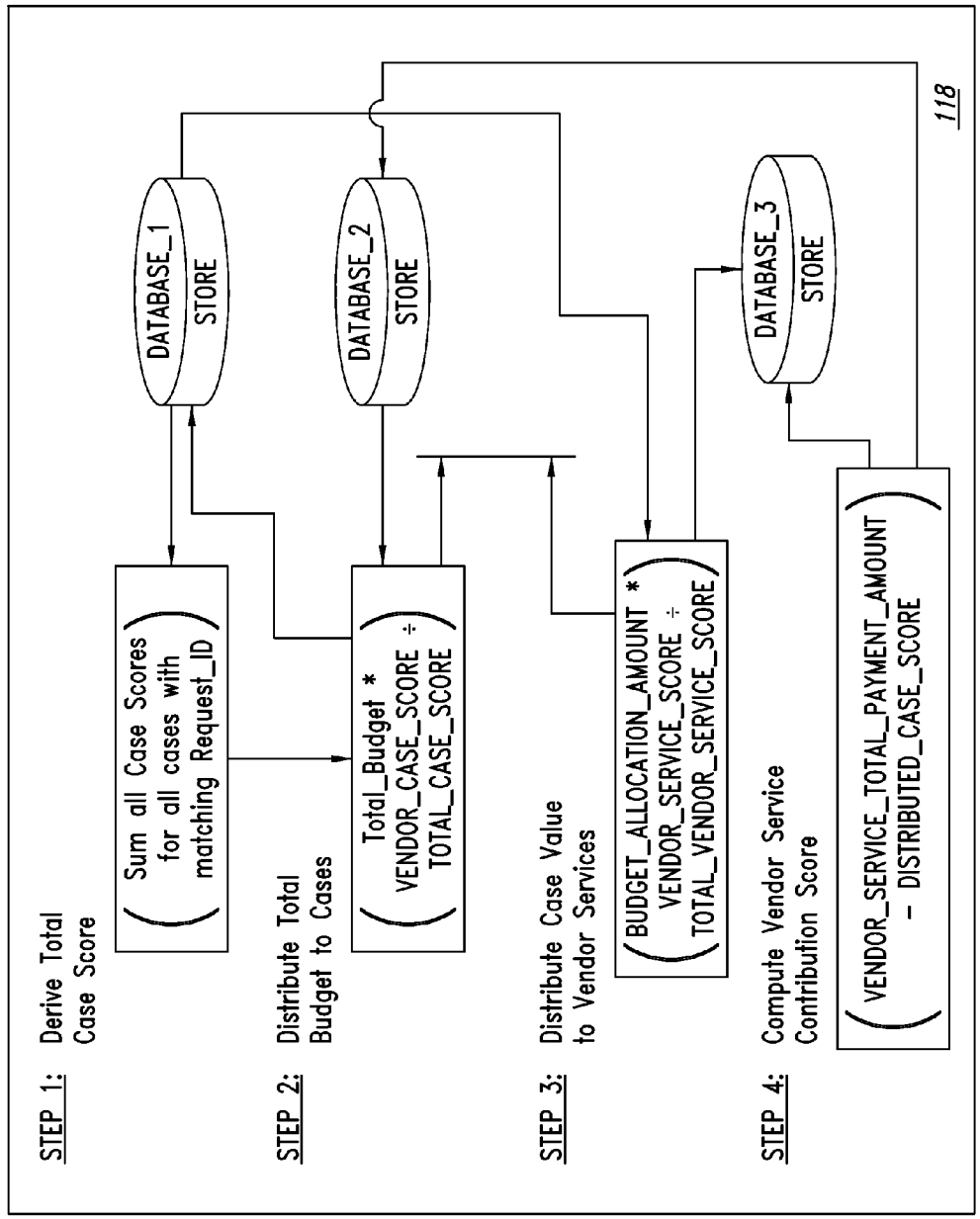
FIG. 7 illustrates a data flow used in vendor value contribution data (VVCD) module embodiment to produce a vendor value contribution score.

FIG. 7 illustrates a data flow used in the vendor value contribution data (VVCD) module 118 embodiment to produce a vendor value contribution score. The vendor value contribution score may be used by an agency to measure the quality of goods and services provided by vendors.

At Step 1, in the data flow of FIG. 7, data is drawn from a repository DATABASE_1. The data may be indexed by a Request_ID or by some other means. The data drawn from the repository DATABASE_1 includes results that were generated in the modeling and initialization module 114. That is, the input at Step 1 of FIG. 7 includes a plurality of case scores. At Step 1, the VVCD module 118 computes a sum of all cases that correspond to the particular Request_ID so as to produce a total case score. A total case score can be computed in the data flow of FIG. 7 as illustrated in Equation (3).

$$\sum_{N=1}^{Max} (Case\_Score) \quad (3)$$

wherein Max = # cases of requested criteria.

wherein Max=# cases of requested criteria.

At Step 2, a total budget to all cases is distributed. The distribution is performed by allocating a comprehensive budget amount of money amongst a proportion formed of an individual case score to a total case score. A total budget number may be drawn from a repository DATABASE_2 based on a particular Request_ID. A total case score may be input from Step 1. The distribution of total budget may be performed with a computation illustrated in Equation (4).

$$(Total\_Budget*(Case\_Score/Total\_Case\_Score)) \quad (4)$$

Upon completion of the total budget computations, the repositories may be updated. Particularly, the budget allocation data may be stored in DATABASE_1 and DATABASE_2.

At Step 3, case value data is distributed to particular vendor services. The case value data may be withdrawn from a repository DATABASE_1. Alternatively, the case value data may be held locally in storage space when generated during another part of a VCA calculation (e.g., Step 1 of the VVCD module 118). That is, the case data may include the budget allocation data previously produced. Additional data for the case value distribution computation includes a vendor service score and a total vendor service score. The vendor score data is generally computed by the vendor value data (VVD) module 116.

The distribution of case value to vendor services performed at Step 3 of FIG. 7 is illustrated in Equation (5).

$$(Budget\_Allocation\_Amount*(Vendor\_Service\_Value/Total\_Vendor\_Service\_Score)) \quad (5)$$

Upon completion of the case value distribution computations, the repositories may be updated. Particularly, the case value distribution data may be stored in the repositories DATABASE_2 and DATABASE_3.

In Step 4 of the data flow of FIG. 7, the vendor service contribution data is generated. The vendor service contribution computations that are performed at Step 4 of the embodiment of FIG. 7 are illustrated in Equation (6).

$$(Vendor\_Service\_Total\_Payment\_Amount - Distributed\_Case\_Score) \quad (6)$$

In Equation (6), a Distributed_Case_Score is illustrated as being subtracted from a Vendor_Service_Total_Payment_Amount. It is understood that the mathematical combination of a distributed case score and a total amount of money paid to a vendor is merely one way of combining the values to produce the vendor service contribution data. The values may be combined in other ways. For example, the values may be added, multiplied, divided, scaled, normalized, or combined in some other way. The mathematical combination provides a mechanism whereby one measure of value that is paid to the vendor is combined with one measure of value that is provided to a client. In embodiments of the VCA system any one of many different combinations will allow an apples-to-apple comparison of vendors as long as the same mathematical combination is performed in the assessment of each vendor.

Vendor value contribution data may be calculated for each vendor that provides goods or services to the service agency. Alternatively or in addition, vendor value contribution data may be calculated for each good or service provided by one or more vendors. The particular value contributions may be used to compare the cost of services provided against the value of the benefit provided to a client of the services agency. Additionally or alternatively, the particular value contributions may be used to compare the quality of one vendor against other vendors, which comparison can provide the services agency with sufficient data to continue contracting with a particular vendor, expand contracting with a particular vendor, or reduce (or completely stop) contracting with a particular vendor.

As described in Steps 1-4 of the VVCD module 118, an embodiment of the vendor contribution assessment (VCA) system calculates a vendor value contribution data (VVCD) score. The VVCD score is an objective scoring of the value of goods and services provided by a vendor to a client. Stated differently, the VVCD score is an assignment of value from each case to the vendors that provided the goods and services for that particular case. The factors that drive value from a case to a particular vendor are related to the type of goods and services provided and the volume of goods and services provided.

With reference to FIG. 3, the vendor value contribution data (VVCD) module 118 can be further described. In a non-limiting VR service agency embodiment of a VVCD module 118, computations may be further illustrated in accordance with the injured plumber example discussed herein. The particular discussion may include procedures that execute the computations of the data flow of FIG. 7.

A first procedure associated with the VVCD module 118 distributes case score data from the VVCD module 118. A VVD score may be understood as a representation of value provided by a vendor in a particular case. With respect to the goods and services provided to the injured plumber, a VVD score is generated to represent the value of goods and services provided to injured plumber. For other cases wherein vendors provided the same goods or services, a VVD score is also generated. The first procedure receives as an input the VVD score for each case within a certain time period that has delivered the particular good or service. The VVD scores are summed in the first procedure. Additionally, the total budget for all VR cases is retrieved and used as a multiplier to the ratio between the VVD score of a certain case and the combined VVD score of all cases having similar goods and services criteria. The resulting case budget allocation amount is stored for later evaluation.

In a second procedure associated with the VVCD module 118, the case budget allocation amount is retrieved and used to generate a distributed case score. That is, in the second procedure of the VVCD module 118, a case score is distributed to each vendor service within a case. A particular vendor service score is divided by the sum of vendor service scores and multiplied by the input case budget allocation amount. The resulting product is a distributed case score value. i.e., a projected, calculated value of the goods and services provided by the vendor for the particular case. In the case of the injured plumber, the calculated value of the goods and services provided to the plumber is determined. The calculated value will subsequently be correlated with the actual value for the goods and services paid by the services agency. If the agency has paid more for the actual goods and services than calculated, then the quality of the services agency is perceived to be reduced. Alternatively, if the agency has paid less for the actual goods and services than calculated, then the quality of the services agency is perceived to be increased. Accordingly, the second procedure determines a vendor value contribution data (VVCD) score by mathematically combining (e.g., subtracting) the actual cost paid for a particular good or service by the services agency from distributed case score value.

An embodiment of a vendor contribution assessment (VCA) system 10 (FIG. 1) may be further understood with a comprehensive example provided by way of a flowchart diagram.

Figure 8:
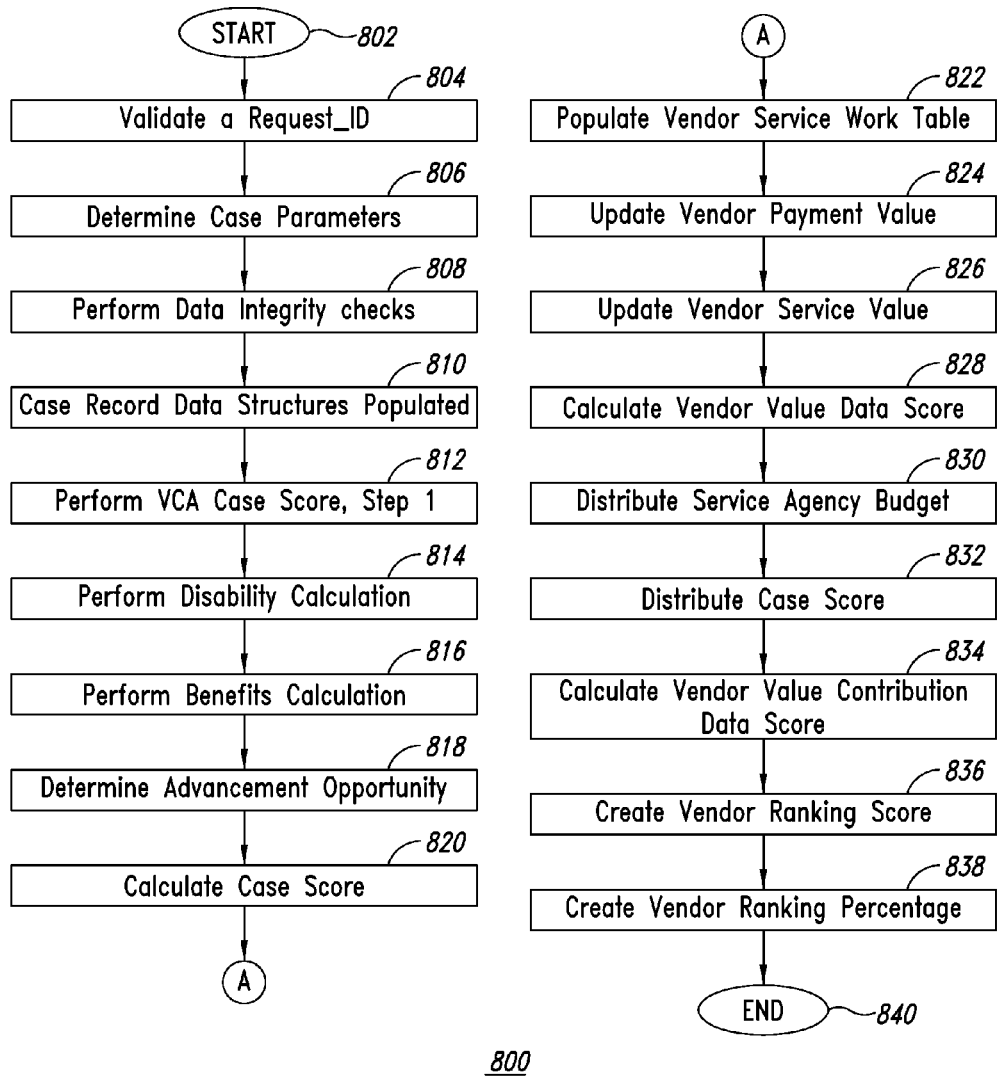
FIG. 8 illustrates a flowchart of a vendor contribution assessment (VCA) system according to one embodiment.

FIG. 8 illustrates a flowchart of a vendor contribution assessment (VCA) system 800 according to one embodiment. The non-limiting embodiment of FIG. 8 is particular to a vocational rehabilitation service agency. The process begins at 802 wherein a request for a VCA calculation is made. A particular Request_ID is passed with the initial request for the VCA calculation. The Request_ID may be correlated to a specific case, and the Request_ID may be further correlated to a specific good or service provided by a certain vendor in the specific case.

At 804, the Request_ID is validated. An error check may abort the processing of the VCA system if the Request_ID is not associated with a known case or vendor provided good or service. At 806, certain case parameters are determined. The case parameters are associated with the case identified by the Request_ID. For example, a start date and an end date for the case are identified.

At 808, additional data integrity checks are performed. Any or all of the data integrity checks may be optional. In some cases, when a data integrity check fails, default data is used so that the VCA system processing may continue. In other cases, the processing of the VCA system may be aborted. The data integrity checks may include checks according to Table 2.

TABLE 2

Data Integrity Checks.

| Check | Value |
| --- | --- |
| Require at least one service category or service subcategory lookup record. | >0 |
| Ensure at least one case record with all values present. | >0 |
| Ensure at least one vendor record with all values present. | 1 |
| Ensure at least one earnings record with all values present. | 1 |
| Ensure at least one client disability record with all values present. | 1 |
| Ensure all County lookup records contain an annual living wage amount. | 1 |
| Ensure at least one employment opportunity lookup table record with an advancement opportunity. | >0 |
| Ensure case driver table contains a record with an "earnings" entry. | Text |
| Ensure case driver table contains a record with a "severity" entry. | 1..3 |
| Ensure case driver table contains a record with an "advancement" entry. | 1..4 |
| Ensure case driver table contains a record with a "benefits" entry. | 0..1 |
| Ensure that there are no client earning values that exceed maximum. | Test |
| Ensure that there are no client disability severity values that exceed maximum. | Test |
| Ensure that there are no client advancement values that exceed maximum. | Test |
| Ensure that there are no client benefit values that exceed maximum. | Test |
| Ensure that sum of case driver weight percentages is 100% | 1 |
| Ensure that sum of vendor driver weight percentages is 100% | 1 |
| Ensure the case driver maximum * case driver multiplication factor = the case driver maximum normalized value for each record in the case driver table. | 1 |
| Ensure the vendor driver maximum * vendor driver multiplication factor = the vendor driver maximum normalized value for each record in the vendor driver table. | 1 |
| Ensure starting wage % <= ending wage % | 1 |
| Ensure starting wage % – ending wage % do not overlap | 1 |
| Ensure client disability starting and ending counts are within range | 1 |
| Ensure client disability starting count – ending count do not overlap | 1 |

At 810, case record data structures are populated.

At 812, the first step of calculating a VCA case score is performed. For example, wage and earnings data for the client and the geographic location may be determined, including starting and ending wages for certain periods of time. At 814, an optional disability calculation step is performed, and at 816, a determination of whether or not an employer provides benefits is calculated. At 818, a determination of the advancement opportunities that may be available to the client is determined. Using data generated in previous steps, a case score is calculated at 820. The case score may be determined according to equations presented herein with respect to FIGS. 3-5.

At 822, a vendor service work table is populated. The work table may contain goods and services categories related to the particular service agency. In a VR service agency, one non-limiting set of goods and services data types is presented in Table 1. At 824 and 826 respectively, vendor payment values and vendor service values are updated. The particular updates may be performed in accordance with FIG. 6. At 828, a vendor service score is calculated. The vendor service score (e.g., vendor value data score (VVD)) represents a benefit that a client of the service agency receives as a result of inbound, vendor-provided goods and services.

At 830, a procedure to calculate a vendor contribution score begins. The processing to generate the vendor contribution score may include processing as illustrated in FIG. 7. Particularly, at 830, the service agency budget is distributed for each case as a representative of the case score relative to the sum total of all case scores. At 832, the distributed budget amount is further distributed across a ratio of a vendor's service score to the vendor's total score so as to produce a vendor's distributed case score, and at 834, a vendor's service contribution score is calculated. The contribution score is calculated by mathematically combining (e.g., subtracting) a total amount of money paid by the service agency to a vendor from the vendor's distributed case score. This vendor's service contribution score can subsequently be used to measure value that a vendor has created for a client by delivering the good or performing the service against the amount of money the paid by the service agency paid to the vendor for the delivery of the good or service.

At 836, the vendor's service contribution score can be used to create a ranking score whereby vendor's that provide corresponding goods or services can be compared to each other. The comparison takes into account the value of the services provided and the amount of money paid to the vendor for the provision of the goods or services. At 838, the vendor ranking is calculated as a percentage.

At 840, in some embodiments, particular reports that include the generated data presented in one or more particular formats may be produced. Also at 840, the vendor contribution assessment (VCA) system 800 ends processing.

Another embodiment of a vendor contribution assessment (VCA) system 10 (FIG. 1) may be further understood with a conceptual example provided by way of a block diagram that relates how money flows through a services agency. The tracking of money through the services agency is further correlated with value received from goods and services provided by vendors. Finally, the determination of a quantified score by which vendors may be compared to each other is presented.

Figure 9:
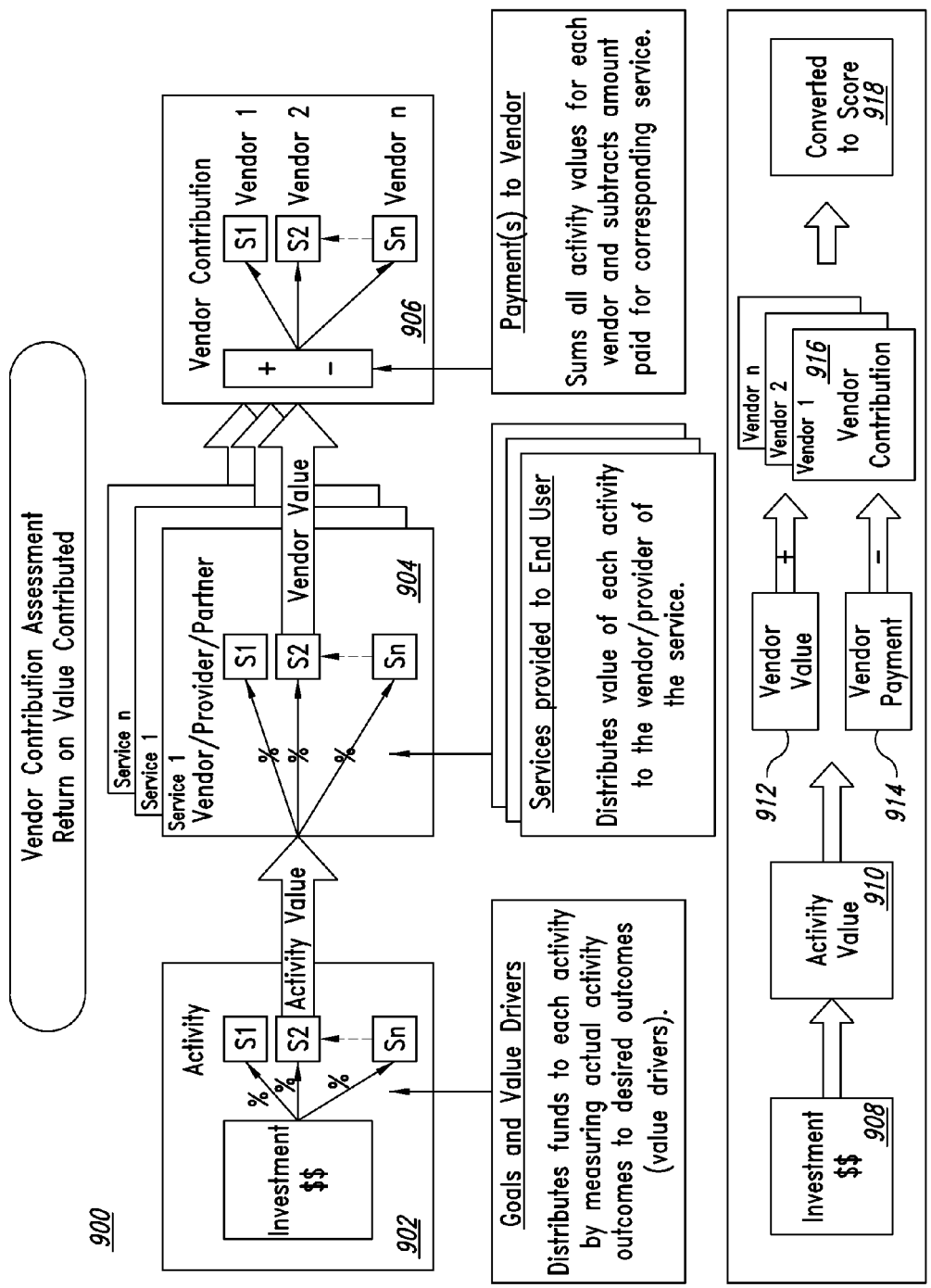
FIG. 9 illustrates a block diagram of a vendor contribution assessment (VCA) system according to one embodiment.

FIG. 9 illustrates a block diagram of a vendor contribution assessment (VCA) system 900 according to one embodiment.

At 902, a service agency is organized. The service agency may include any type of service agency. A non-limiting list of service agencies includes local, state, or federal agencies, mid-size and large commercial agencies (e.g., home builders, airplane manufacturers, automobile manufacturers, human resources or other organizations within commercial entities, franchises, retailers, software development companies, and the like), non-profit agencies, International goods or services providers, and many others.

The service agency at 902 receives a financial income investment. The financial income investment represents income to the agency. Some percentage of the agency's income is distributed to goods and services providers. The number of goods and services providers is large (e.g., more than 250 in some cases; more than 2500 in other cases). The number of contracts for goods and services provided is also large (e.g., more than 2,500 in some cases; more than 25,000 in some cases).

The service agency at 902 has a desire to measure the effectiveness of vendors that the agency pays to provide goods and services. Accordingly, the service agency keeps track of money that is paid to each vendor. Additionally, the service agency keeps track how much money is paid for each quantifiable good and service. In order to measure the effectiveness of each vendor, the service agency will also keep track of the actual activity outcomes for the goods and services contracted. Subsequently, the actual activity outcomes will be compared to the desired outcomes.

In the transition between 902 and 904, the vendor provides the contracted good or performs the contracted service. There is a value to the end user (e.g., client) of the goods and services provided by the vendor. In some cases, for example where the service agency is a municipal agency, the end user is a client of the agency. In one embodiment discussed herein, the agency is a vocational rehabilitation agency that provides employment services to outside clients. In another embodiment, the agency is a commercial entity and the client is a human resources department within the commercial entity. Accordingly, an end user or client of the service agency may be an entity within the service agency, or the end user may be an entity or client that is outside of the agency.

At 904, the vendor (e.g., provider, partner, or the like) completes the providing of the good or service. The value actually provided by each vendor for each good or service is calculated. The calculation of value on a per vendor basis, for each good or service provided, may be normalized relative to the amount of money that the vendor receives for the individual good or service and further quantified relative to all of the money that the service agency spends for goods and services. The representations of value for each good or service, on a per vendor basis in calculated in the transition between 904 and 906.

At 906, actual payments to each vendor, for each good and service, is correlated with the calculation of value for the good and service. The sum of all activity value for each vendor is calculated and so divided as to determine the value cost for the good and service that the vendor actually provided. The amount of money paid by the service provider for each good and service is mathematically combined (e.g., subtracted) the actual calculated cost of the good or service. In this manner, the contribution of each vendor for each good and service provided may be calculated. The calculated contribution has been quantified such that the effectiveness (e.g., cost to provide a certain good or service) of one vendor may be fairly compared to the effectiveness other vendors. At 906, the calculated vendor contribution scores may be reported in many ways.

For example, at 906, the percentile ranking of effectiveness of each vendor may be reported in such a way that the vendors are ranked. In some cases, vendors provide more value than the vendors are paid for. In such cases, the vendor is able to provide better, more efficient, lower cost, or some other higher value than other vendors when providing a comparable good or service. In other cases, it may be learned that some vendors are very inefficient in providing goods and services (e.g., the goods or services are very expensive or take a very long time, which reduces the value of the goods or services as provided to the client).

At 908 to 918, an even more simplified block diagram of a vendor contribution assessment (VCA) system 900 according to one embodiment is provided. At 908, investment income is input into the service agency. The income is paid in some proportion to various vendors for goods and services. In return, the vendors provide goods and services as activity value at 910. At 912, the actual vendor value for the goods and services is calculated relative to the amount of money paid for such goods and services. At 914, the amount of money paid to the vendor for the goods and services provided is recognized and associated with the actual goods and services provided. At 916, the contribution of value of each vendor, for each good and service provided, is calculated and quantified. The value for any particular good, in any particular time frame or quantity, can be normalized so that when multiple vendors provide the same or equivalent good, the vendor score calculations can be evenly compared. Similarly, the provision of services can be quantified and normalized for fair comparison between vendors. At 918, the vendor contributions are converted to a score such that the performance of any one vendor may be compared to one or more other vendors.

Unless the context requires otherwise, throughout the specification and claims, the word "comprise" and variations thereof, such as, "comprises" and "comprising" are to be construed in an open, inclusive sense; that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary subject based communication facilitation server computing system generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer implemented method of assessing vendor performance, comprising:

storing a set of data related to a service agency in an electronic database, the set of data having a plurality of at least six datasets;

storing in a first one of the datasets a total-budget value, the total-budget value representative of a sum of money the agency has paid for a plurality of service items provided by a plurality of vendors in a plurality of cases wherein each of the plurality of service items is substantially the same type of service item as the other service items and wherein each vendor provides one or more service items in each of one or more cases of the plurality of cases assigned to the vendor;

storing, for each case assigned to each vendor, in a second one of the datasets an amount-paid value, the amount-paid value representative of the corresponding payment from the service agency;

storing, for each case assigned to each vendor, in a third one of the datasets a case-score value, the case-score value representing a value of the service items provided by each vendor;

storing in a fourth one of the datasets a total-case-score value, the total-case-score value formed by summing the case-score values stored in the third one of the datasets;

storing, for each case assigned to each vendor, in a fifth one of the datasets a vendor-service-score value, the vendor-service-score value corresponding to a certain relative value added to the case via the provision of the one or more service items of the plurality of service items provided by each vendor in exchange for a corresponding payment from the service agency;

storing in a sixth one of the datasets a total-vendor-services-score value, the total-vendor-services-score value formed by summing the vendor-services-score values stored in the fifth one of the datasets;

iteratively selecting each vendor of the plurality of vendors;

executing instructions with a computing device, the instructions stored in a memory associated with the computing device, the execution of the instructions arranged to carry out the act of forming a vendor-score-contribution value associated with each of the plurality of vendors, the vendor-score-contribution value formed by:

mathematically combining the total-budget value, the vendor-service-score value of the selected vendor, and the total-vendor-services-score value to form a case value;

distributing the case value to the one or more service items of the plurality of service items provided by the selected vendor; and computing a net contribution of the selected vendor by mathematically combining the distributed case value from the amount-paid value corresponding to the one vendor; and outputting a report, the report reflecting the computed net contribution of at least one vendor of the plurality of vendors.

2. The computer implemented method according to claim 1 wherein forming the vendor-score-contribution value comprises:

generating a budget-allocation value, the budget-allocation value generated by multiplying the total-budget value by a quotient formed by summing each case-score value related to the one vendor and dividing the sum by the total-case-score value;

generating a case-distribution value, the case-distribution value generated by multiplying the budget-allocation value by a quotient formed by summing each vendor-service-score value related to the one vendor and dividing the sum by the total-vendor-services-score value; and generating the vendor-score-contribution value by subtracting the amount-paid value from the case-distribution value.

3. The computer implemented method according to claim 1, further comprising:

selecting a first vendor and a second vendor; and
comparing the vendor-score-contribution value associated with the first vendor to the vendor-score-contribution value associated with the second vendor.

4. The computer implemented method according to claim 1, further comprising:

sorting the vendors according to the vendor-score-contribution values of each of the plurality of vendors;
forming the report to reflect the sorted vendors.

5. The computer implemented method according to claim 1 wherein storing the case-score value comprises:

selecting one vendor of the plurality of vendors;
iteratively selecting a representation of value provided to a client as a result of the one vendor providing a service item to the client;
scaling the representation of value to place the representation of value within a certain range;
weighting the scaled representation of value by multiplying the scaled representation of value by a weighting factor;
summing the weighted and scaled representation of value of each iteration; and
storing the summed, weighted, and scaled representations of value in a case-score value memory.

6. The computer implemented method according to claim 1 wherein storing the vendor-service-score value comprises:

selecting one vendor of the plurality of vendors;
selecting the amount-paid value corresponding to the one vendor;
scaling the amount-paid value to place the amount-paid value within a first certain range;
weighting the scaled the amount-paid value by multiplying the scaled amount-paid value by a first weighting factor;
selecting a representation of value of the service item provided to a client;
scaling the representation of value to place the representation of value within a second certain range;
weighting the scaled the representation of value by multiplying the scaled the representation of value by a second weighting factor;
summing the weighted and scaled amount-paid value with the weighted and scaled representation of value; and
storing the sum in a vendor-service-score value memory.

7. The computer implemented method according to claim 1 wherein a vendor performance assessment is presented on an electronic display.

8. The computer implemented method according to claim 1 wherein the service agency is a vocational rehabilitation agency.

9. The computer implemented method according to claim 1 wherein the service agency is a corporation.

10. The computer implemented method according to claim 1 wherein the service items are career counseling hours.

11. The computer implemented method according to claim 1 wherein the service items are prosthetic limbs.

12. The computer implemented method according to claim 1 wherein the vendor-service-score value is a quantity of service items provided.

13. The computer implemented method according to claim 1 wherein the electronic database is a SQL database.

14. A computing system, comprising:

a central processing unit, a memory, and an input/output port configured in hardware and software as several modules, said modules including:

a modeling and initialization module configured to;
store a set of data related to a service agency in an electronic database configured in the memory, the set of data having a plurality of at least six datasets;
store in a first dataset a total-budget value, the total-budget value representative of a sum of money the agency has paid for a plurality of service items provided by a plurality of vendors in a plurality of cases wherein each of the plurality of service items is substantially the same type of service item as the other service items and wherein each vendor provides one or more service items in each of one or more cases of the plurality of cases assigned to the vendor;
store, for each case assigned to each vendor, in a second one of the datasets an amount-paid value, the amount-paid value representative of the corresponding payment from the service agency;
store, for each case assigned to each vendor, in a third one of the datasets a case-score value, the case-score value representing a value of the service items provided by each vendor; and
store in a fourth one of the datasets a total-case-score value, the total-case-score value formed by summing the case-score values stored in the third one of the datasets;

a vendor value data module configured to:
store, for each case assigned to each vendor, in a fifth one of the datasets a vendor-service-score value, the vendor-service-score value corresponding to a certain relative value added to the case via the provision of the one or more service items of the plurality of service items provided by each vendor in exchange for a corresponding payment from the service agency; and
store in a sixth one of the datasets a total-vendor-services-score value, the total-vendor-services-score value formed by summing the vendor-services-score values stored in the fifth one of the datasets; and a vendor value contribution data module configured to:
iteratively select each vendor of the plurality of vendors;
form a vendor-score-contribution value associated with each of the plurality of vendors, the vendor-score-contribution value formed by:

mathematically combine the total-budget value, the vendor-service-score value of the selected vendor, and the total-vendor-services-score value to form a case value;

distribute the case value to the one or more service items of the plurality of service items provided by the selected vendor; and compute a net contribution of the selected vendor by mathematically combining the distributed case value from the amount-paid value corresponding to the one vendor; and output a report, the report reflecting the computed net contribution of at least one vendor of the plurality of vendors.

15. The computing system according to claim 14, further comprising:

an electronic display, the electronic display configured to display the vendor-score-contribution value.

16. The computing system according to claim 14 wherein the service agency is a vocational rehabilitation agency.

17. The computing system according to claim 14 wherein the service agency is a corporation.

18. A non-transitory computer-readable storage medium whose stored contents configure a computing system to perform a method, the method comprising:

storing a set of data related to a service agency in an electronic database, the set of data having a plurality of at least six datasets;

storing in a first one of the datasets a total-budget value, the total-budget value representative of a sum of money the agency has paid for a plurality of service items provided by a plurality of vendors in a plurality of cases wherein each of the plurality of service items is substantially the same type of service item as the other service items and wherein each vendor provides one or more service items in each of one or more cases of the plurality of cases assigned to the vendor;

storing, for each case assigned to each vendor, in a second one of the datasets an amount-paid value, the amount-paid value representative of the corresponding payment from the service agency;

storing, for each case assigned to each vendor, in a third one of the datasets a case-score value, the case-score value representing a value of the service items provided by each vendor;

storing in a fourth one of the datasets a total-case-score value, the total-case-score value formed by summing the case-score values stored in the third one of the datasets;

storing, for each case assigned to each vendor, in a fifth one of the datasets a vendor-service-score value, the vendor-service-score value corresponding to a certain relative value added to the case via the provision of the one or more service items of the plurality of service items provided by each vendor in exchange for a corresponding payment from the service agency;

storing in a sixth one of the datasets a total-vendor-services-score value, the total-vendor-services-score value formed by summing the vendor-services-score values stored in the fifth one of the datasets;

iteratively selecting each vendor of the plurality of vendors;

forming a vendor-score-contribution value associated with each of the plurality of vendors, the vendor-score-contribution value formed by:

mathematically combining the total-budget value, the vendor-service-score value of the selected vendor, and the total-vendor-services-score value to form a case value;

distributing the case value to the one or more service items of the plurality of service items provided by the selected vendor; and computing a net contribution of the selected vendor by mathematically combining the distributed case value from the amount-paid value corresponding to the one vendor; and outputting a report, the report reflecting the computed net contribution of at least one vendor of the plurality of vendors.

19. The non-transitory computer-readable storage medium according to claim 18 wherein forming the vendor-score-contribution value comprises:

generating a budget-allocation value, the budget-allocation value generated by multiplying the total-budget value by a quotient formed by summing each case-score value related to the one vendor and dividing the sum by the total-case-score value;

generating a case-distribution value, the case-distribution value generated by multiplying the budget-allocation value by a quotient formed by summing each vendor-service-score value related to the one vendor and dividing the sum by the total-vendor-services-score value; and generating the vendor-score-contribution value by subtracting the amount-paid value from the case-distribution value.

20. The non-transitory computer-readable storage medium according to claim 18, further comprising:

sorting the vendors according to the vendor-score-contribution values of each of the plurality of vendors;

forming the report to reflect the sorted vendors.

* * * * *